US009888177B2

(12) United States Patent
Yachi

(10) Patent No.: US 9,888,177 B2
(45) Date of Patent: Feb. 6, 2018

(54) IMAGING DEVICE AND ELECTRONIC DEVICE

(71) Applicant: OLYMPUS CORPORATION, Hachioji-shi, Tokyo (JP)

(72) Inventor: Akikazu Yachi, Tokorozawa (JP)

(73) Assignee: Olympus Corporation, Tokyo (JP)

( * ) Notice: Subject to any disclaimer, the term of this patent is extended or adjusted under 35 U.S.C. 154(b) by 127 days.

(21) Appl. No.: 15/092,346

(22) Filed: Apr. 6, 2016

(65) Prior Publication Data

US 2016/0219221 A1 Jul. 28, 2016

Related U.S. Application Data

(63) Continuation of application No. PCT/JP2014/075801, filed on Sep. 29, 2014.

(30) Foreign Application Priority Data

Oct. 8, 2013 (JP) .................................. 2013-210714

(51) Int. Cl.
*H04N 5/232* (2006.01)
*G01C 3/06* (2006.01)
(Continued)

(52) U.S. Cl.
CPC .......... *H04N 5/23264* (2013.01); *G01C 3/06* (2013.01); *G02B 7/38* (2013.01); *G03B 13/36* (2013.01);
(Continued)

(58) Field of Classification Search
CPC .. H04N 5/23264; H04N 5/2327; H04N 5/243; H04N 5/347; H04N 5/23212;
(Continued)

(56) References Cited

U.S. PATENT DOCUMENTS 6,953,561 B2 * 10/2005 Wolfsteiner ........... B01J 19/249
180/313
9,258,470 B1 * 2/2016 Zhou .................... H04N 5/2258
(Continued)

FOREIGN PATENT DOCUMENTS

JP       04343312 A     11/1992
JP       05030409 A      2/1993
(Continued)

OTHER PUBLICATIONS

International Search Report (ISR) dated Jan. 6, 2015 issued in International Application No. PCT/JP2014/075801.
(Continued)

*Primary Examiner* — Roberto Velez
*Assistant Examiner* — Tuan Le
(74) *Attorney, Agent, or Firm* — Holtz Holtz & Volek PC

(57) ABSTRACT

An imaging device includes a first image sensor that is placed to intersect the optical axis of an imaging lens, a second image sensor that is placed to intersect the optical axis of the imaging lens so as to be situated at a given distance from the first image sensor, and receives light that has passed through the first image sensor, and a processor including hardware, wherein the processor is configured to implement a brightness correction process that amplifies the pixel value of the second image captured by the second image sensor using a gain set based on the light transmittance of a light-receiving section of the first image sensor, and an object distance calculation process that performs a depth-from-defocus (DFD) process based on the pixel value of the first image and the pixel value of the second image subjected to the brightness correction process to calculate an object distance.

12 Claims, 20 Drawing Sheets

(51) Int. Cl.
*G02B 7/38* (2006.01)
*G03B 13/36* (2006.01)
*H04N 9/04* (2006.01)
*H04N 5/225* (2006.01)
*H04N 5/243* (2006.01)
*H04N 5/347* (2011.01)

(52) U.S. Cl.
CPC ......... *H04N 5/2253* (2013.01); *H04N 5/2327* (2013.01); *H04N 5/23212* (2013.01); *H04N 5/243* (2013.01); *H04N 5/347* (2013.01); *H04N 9/04* (2013.01); *H04N 9/045* (2013.01)

(58) Field of Classification Search
CPC ........ H04N 9/045; H04N 5/2253; H04N 9/04; G03B 13/36; G02B 7/38; G02B 27/0075; G01C 3/06; G01C 3/32
See application file for complete search history.

(56) References Cited

U.S. PATENT DOCUMENTS

| | | | | |
|---|---|---|---|---|
| 2003/0179361 A1* | 9/2003 | Ohtomo | ................... | G01C 1/02 356/4.01 |
| 2010/0053417 A1* | 3/2010 | Baxansky | .......... | H04N 5/23212 348/345 |
| 2011/0102308 A1 | 5/2011 | Nakamura et al. | | |
| 2012/0049044 A1 | 3/2012 | Kuboi | | |
| 2012/0140064 A1* | 6/2012 | Kimura | ................... | G01C 3/32 348/135 |
| 2012/0154668 A1* | 6/2012 | Kimura | ................... | G01C 3/32 348/348 |
| 2012/0300114 A1* | 11/2012 | Isogai | ................... | G01S 17/46 348/345 |
| 2013/0121537 A1 | 5/2013 | Monobe et al. | | |
| 2013/0335534 A1* | 12/2013 | Hanzawa | .......... | H04N 5/23212 348/50 |

FOREIGN PATENT DOCUMENTS

| | | |
|---|---|---|
| JP | 2007049566 A | 2/2007 |
| JP | 2009092909 A | 4/2009 |
| JP | 2011118330 A | 6/2011 |
| JP | 2011171749 A | 9/2011 |
| JP | 2012049289 A | 3/2012 |
| JP | 2013171257 A | 9/2013 |
| JP | 2013205516 A | 10/2013 |
| WO | 2012164881 A1 | 12/2012 |

OTHER PUBLICATIONS

Murali Subbarao, et al., "Depth from Defocus: A Spatial Domain Approach", International Journal of Computer Vision, 1994, vol. 13, No. 3, 33 Pages.

* cited by examiner

IMAGING DEVICE AND ELECTRONIC DEVICE

CROSS REFERENCE TO RELATED APPLICATION

This application is a continuation of International Patent Application No. PCT/JP2014/075801, having an international filing date of Sep. 29, 2014, which designated the United States, the entirety of which is incorporated herein by reference. Japanese Patent Application No. 2013-210714 filed on Oct. 8, 2013 is also incorporated herein by reference in its entirety.

BACKGROUND

The present invention relates to an imaging device, an electronic device, and the like.

Technology that is referred to as depth-from-defocus (DFD) is known that acquires a plurality of images that are identical in scene, but differ in focal distance (or in-focus object plane position (that represents the position of the object in an in-focus state)) using a camera, and measures the distance by utilizing the fact that the spread parameter (that represents the correlation between the images as to the amount of defocus) and the object distance have a one-to-one relationship.

JP-A-4-343312 discloses a method that acquires a plurality of images that differ in focal distance by driving the imaging lens in the direction along the optical axis. JP-A-5-30409 discloses a method that divides the incident light using a half mirror or a prism, and simultaneously captures a plurality of images that differ in focus state using a plurality of image sensors placed at positions that differ in optical path length.

It is ideal that the images subjected to DFD only differ in the amount of defocus. If the images subjected to DFD also differ in a factor other than the amount of defocus, the spread parameter may include an error, and the ranging accuracy may deteriorate due to the absence of correct object distance information.

SUMMARY

According to one aspect of the invention, an imaging device comprising:
a first image sensor that is placed to intersect an optical axis of an imaging lens, and captures a first image;
a second image sensor that is placed to intersect the optical axis of the imaging lens so as to be situated at a given distance from the first image sensor, and receives light that has passed through the first image sensor to capture a second image; and
a processor comprising hardware,
wherein the processor is configured to implement:
a brightness correction process that amplifies a pixel value of the second image captured by the second image sensor using a gain that has been set based on a light transmittance of a light-receiving section of the first image sensor; and
an object distance calculation process that performs a depth-from-defocus (DFD) process based on a pixel value of the first image and the pixel value of the second image subjected to the brightness correction process to calculate an object distance, and
the processor is configured to implement the brightness correction process that causes brightness of the second image to be substantially identical to that of the first image.

According to another aspect of the invention, an electronic device includes the imaging device.

DESCRIPTION OF EXEMPLARY EMBODIMENTS

Figure 1:
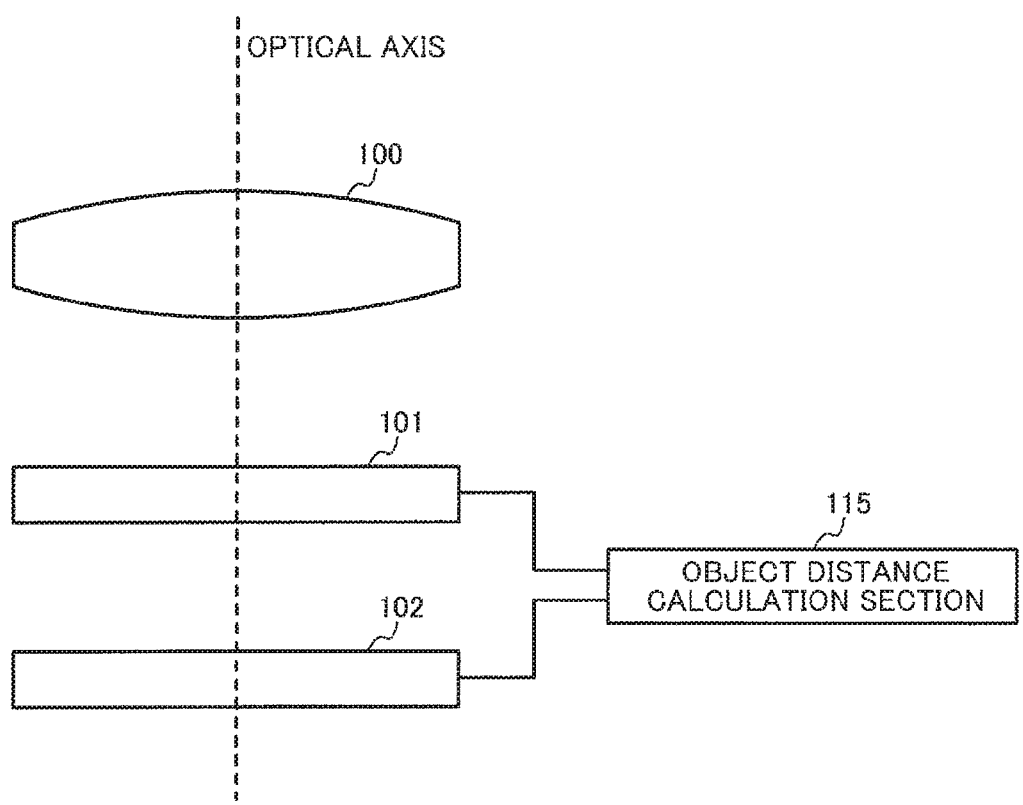
FIG. 1 illustrates a basic configuration example of an imaging device according to several embodiments of the invention.

According to one embodiment of the invention, an imaging device comprising:
a first image sensor that is placed to intersect an optical axis of an imaging lens, and captures a first image;
a second image sensor that is placed to intersect the optical axis of the imaging lens so as to be situated at a given distance from the first image sensor, and receives light that has passed through the first image sensor to capture a second image; and
a processor comprising hardware,
wherein the processor is configured to implement:

a brightness correction process that amplifies a pixel value of the second image captured by the second image sensor using a gain that has been set based on a light transmittance of a light-receiving section of the first image sensor; and an object distance calculation process that performs a depth-from-defocus (DFD) process based on a pixel value of the first image and the pixel value of the second image subjected to the brightness correction process to calculate an object distance, and the processor is configured to implement the brightness correction process that causes brightness of the second image to be substantially identical to that of the first image.

In the imaging device, the processor may be configured to further implement a noise reduction process that causes an SN ratio of the second image subjected to the brightness correction process to be substantially identical to that of the first image.

In the imaging device, the first image sensor may be a direct image sensor that sequentially separates RGB colors in a direction along the optical axis of the imaging lens.

In the imaging device, the first image sensor may be an image sensor that includes given color filters that are placed in a mosaic-like pattern on a pixel basis.

In the imaging device, the first image sensor may be a back-illuminated image sensor in which a transfer electrode is provided on a side of a semiconductor substrate opposite to an illumination side.

In the imaging device, the processor may be configured to further implement a diffraction correction process that performs a process that corrects defocus caused by diffraction due to the first image sensor on the second image captured by the second image sensor.

In the imaging device, the second image sensor may be placed at a given distance L that satisfies L>F×r from the first image sensor in a direction along the optical axis of the imaging lens, F being an F-number determined by a lens system that includes the imaging lens, and r is a size of a permissible circle of confusion.

The imaging device may further include a microlens that is provided to the first image sensor on a pixel basis, and used to focus light.

In the imaging device, the processor may be configured to further implement a pixel binning process, the pixel binning process being performed on at least one of the first image and the second image so that a number of pixels of the first image corresponds to a number of pixels of the second image.

In the imaging device, the processor may be configured to further implement a pixel sampling process, the pixel sampling process being performed on at least one of the first image and the second image so that a number of pixels of the first image corresponds to a number of pixels of the second image.

In the imaging device, the second image sensor may be an image sensor that has a number of pixels that corresponds to a number of pixels of the first image sensor that are used to generate an R signal among RGB signals.

Another embodiment of the invention relates to an electronic device that includes the imaging device.

1. Method

As described above, it is ideal that the images subjected to DFD only differ in the amount of defocus. According to the method disclosed in JP-A-4-343312, however, the imaging lens is driven each time an image is captured. Since a shake or the movement of the object may occur when the imaging lens is driven, a difference in object position or a motion blur may occur between the images. Therefore, the ranging accuracy may deteriorate (i.e., an error may occur).

According to the method disclosed in JP-A-5-30409, since images are simultaneously captured using two image sensors placed at positions that differ in optical path length, it is possible to suppress or reduce the effects of a shake or a motion blur due to a difference in image acquisition timing. According to the method disclosed in JP-A-5-30409, however, it is necessary to provide a half mirror or a prism beam splitter that divides the optical path of the incident light, and a mirror that changes the optical path length. It is necessary to provide a space for guiding the divided light to each image sensor, and a space for providing two image sensors. Therefore, the structure of the imaging device becomes complex, and in increase in cost and size may increase.

In order to solve the above problems, several embodiments of the invention propose a method that places two image sensors side by side in the direction along the optical axis of an imaging lens in view of the fact that light having a relatively long wavelength (i.e., light having a wavelength that corresponds to an R signal (among R, G, and B signals) in a narrow sense) is not completely absorbed by an image sensor, but partially passes therethrough.

According to several embodiments of the invention, an imaging device includes a first image sensor 101 that is placed to intersect the optical axis of an imaging lens 100, a second image sensor 102 that is placed to intersect the optical axis of the imaging lens 100 so as to be situated at a given distance from the first image sensor 101, and receives light that has passed through the first image sensor 101, and an object distance calculation section 115 that performs a depth-from-defocus (DFD) process based on a pixel value of a first image captured by the first image sensor 101 and a pixel value of a second image captured by the second image sensor 102 to calculate the object distance (see FIG. 1).

Note that the term "DFD" refers to a method that calculates the distance to the object (object distance) based on the relationship between a plurality of images as to the amount of defocus (see above), and the term "DFD process" refers to a process that calculates the object distance using DFD.

Figure 6:
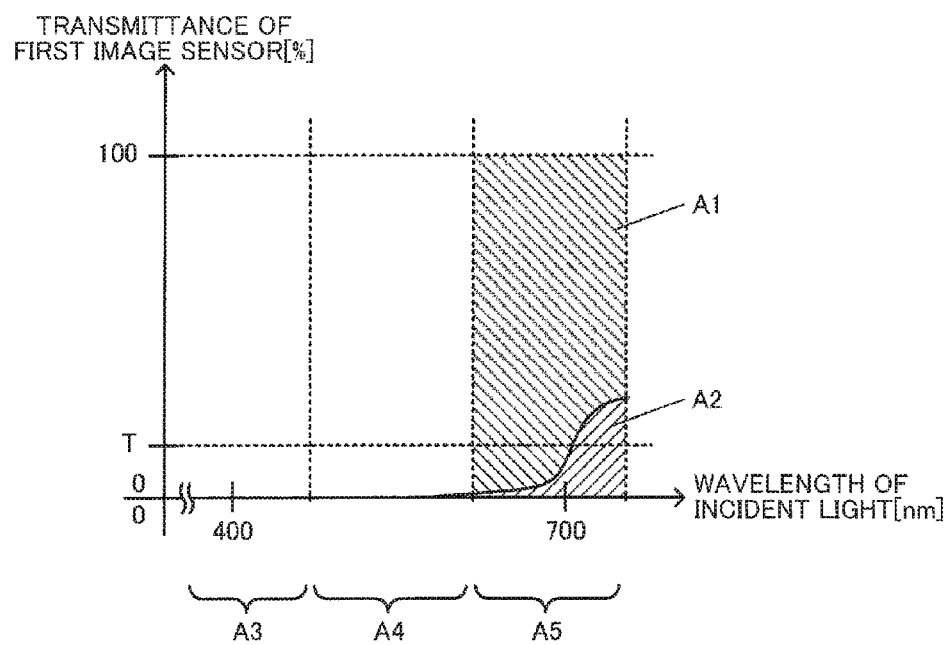
FIG. 6 is a view illustrating the transmittance of a first image sensor with respect to incident light.

The spectral transmittance of the image sensor is determined taking account of the design of the image sensor. As described later with reference to FIG. 6, light having a relatively long wavelength is not completely absorbed by a given image sensor, but partially passes through the image sensor. In the example illustrated in FIG. 6, light that corresponds to the B signal among the RGB signals and has a short wavelength and light that corresponds to the G signal among the RGB signals has a short wavelength (A3 and A4) are almost completely (completely in a narrow sense) absorbed by the image sensor (i.e., do not pass through the image sensor), but light (A5) that corresponds to the R signal and has a wavelength longer than that of the light that corresponds to the B signal and the light that corresponds to the G signal partially passes through the image sensor. Specifically, the part of the light that corresponds to the R signal that is indicated by A1 in FIG. 6 is absorbed by the image sensor, and the part of the light that corresponds to the R signal that is indicated by A2 in FIG. 6 passes through the image sensor.

Specifically, when the first image sensor 101 and the second image sensor 102 are arranged side by side so as to intersect the optical axis of the imaging lens 100 (see FIG. 1), light that has passed through the first image sensor 101 is received by the second image sensor 102 (i.e., a situation in which light is completely absorbed by the first image sensor 101, and does not reach the second image sensor 102 does not occur). Therefore, since it is possible allow the first image sensor 101 and the second image sensor 102 to receive light that corresponds to an identical object without providing a half mirror or the like for separating light, the configuration of the imaging device can be simplified. Since the second image sensor 102 is placed at a given distance from the first image sensor 101 in the direction along the optical axis of the imaging lens 100, a difference in optical path length necessarily occurs when the configuration illustrated in FIG. 1 is used, and it is unnecessary to provide a lens or the like for producing a difference in optical path length.

In this case, the first image sensor 101 can acquire the R signal, the G signal, and the B signal, and the second image sensor 102 can acquire the R signal. Therefore, the image that has been acquired by the first image sensor 101 and corresponds to the R signal (hereinafter may be referred to as "R image") and the image that has been acquired by the second image sensor 102 and corresponds to the R signal are images obtained by capturing an identical object at an identical timing, and are suitable for the DFD process. Therefore, it is possible to suppress or reduce the occurrence of a motion blur and the like, and implement the DFD process with high accuracy by utilizing the method according to several embodiments of the invention illustrated in FIG. 1. Specifically, it is unnecessary to use all of the B signal, the G signal, and the R signal acquired by the first image sensor 101 for the DFD process, and it suffices to use only the signal (i.e., R signal) that corresponds to the signal acquired by the second image sensor 102 for the DFD process. Therefore, the pixel value of the first image mentioned above corresponds to the pixel value of the R image acquired by the first image sensor 101.

When using the method according to several embodiments of the invention, it is necessary for the first image sensor 101 to allow light within a wavelength band that can be received by the second image sensor 102 while maintaining the intensity of the light to a certain extent. It was found that most of the image sensors widely used for a digital still camera and the like allow part of light having a wavelength that corresponds to the R signal to pass through, and various image sensors can be widely used as the first image sensor 101.

Note that the quantity (intensity) of light that is received by the second image sensor 102 can be increased, and the intensity of the signal used to form the second image can be increased by increasing the intensity of light that passes through the first image sensor 101. Therefore, it is considered that the accuracy of the comparison process (i.e., amount-of-defocus comparison process) performed on the first image and the second image can be improved, and the accuracy of the DFD process can also be improved. In view of the above point, an image sensor having a specific structure may be used as the first image sensor 101.

For example, the first image sensor may be a back-illuminated image sensor in which a transfer electrode is provided on a side of a semiconductor substrate opposite to the illumination side.

Figure 18:
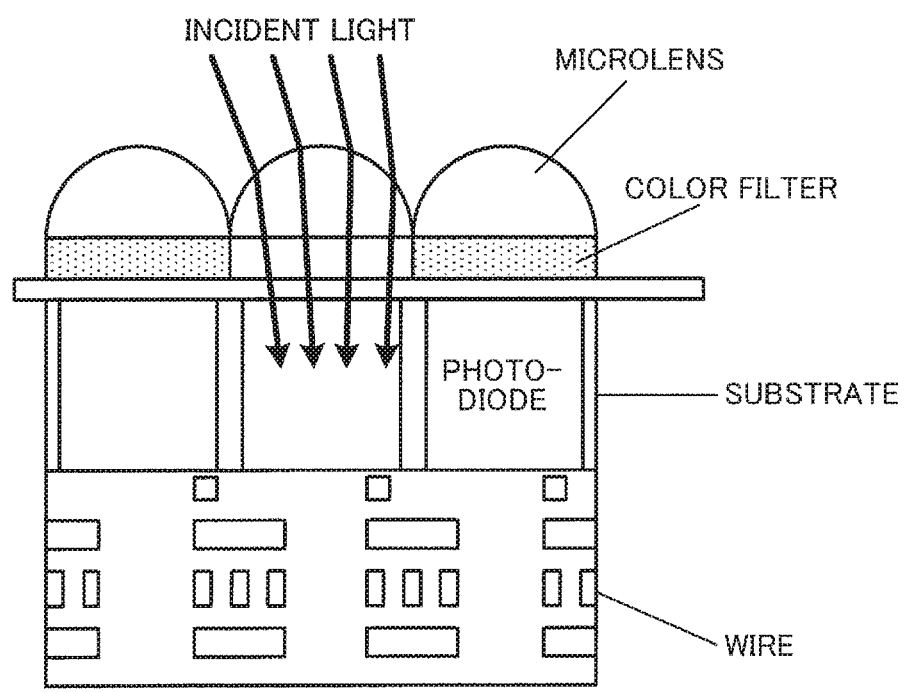
FIG. 18 illustrates a configuration example of a back-illuminated image sensor.

A known image sensor (front-illuminated image sensor) has a configuration in which a transistor and a wiring layer used to input and output a voltage are formed on the side on which light is incident. Therefore, the incidence of light on a light-receiving device (e.g., photodiode) is hindered due to the wires, and deterioration in image and the like occur. On the other hand, the back-illuminated image sensor is configured so that light is applied from the back side of a silicon substrate (see FIG. 18). Therefore, the photodiode can efficiently receive the incident light without being affected by the wires and the like, and the sensitivity characteristics can be improved, for example.

Several embodiments of the invention also focus on the fact that the back-illuminated image sensor has a reduced thickness in addition to the fact that the back-illuminated image sensor can generate a high-quality image. When producing the back-illuminated image sensor, a support substrate is bonded to the surface of a silicon wafer, and the silicon wafer is ground. The back-illuminated image sensor can thus be produced to have a thickness smaller than that of a front-illuminated image sensor and the like. It is possible to suppress or reduce the scattering of light within the image sensor, and increase the intensity of transmitted light by reducing the thickness of the image sensor. Specifically, it is possible to increase the intensity of transmitted light, and increase the quantity (intensity) of light that is received by the second image sensor 102 by utilizing the back-illuminated image sensor as the first image sensor 101. It is thus possible to improve the accuracy of the DFD process, for example.

First to third embodiments of the invention are described below. The first embodiment illustrates an example in which a direct image sensor is used as the first image sensor 101. In this case, the intensity of light that is absorbed by the first image sensor 101 differs from the intensity of light that is absorbed by the second image sensor 102. The first embodiment also illustrates a brightness correction process for obtaining two images having an substantially identical brightness. Since the first image sensor 101 functions as a diffraction grating, defocus that differs from defocus due to the difference in in-focus state also occurs in the second image. The first embodiment also illustrates the details of a process that compensates for the effects of diffraction.

The second embodiment illustrates an example in which a Bayer-type image sensor that is widely used is used as the first image sensor 101. The second embodiment also illustrates a modification in which a microlens is provided to the image sensor on a pixel basis. Note that the microlens need not necessarily be used for a Bayer-type image sensor. The microlens may also be used in connection with the first embodiment. The third embodiment illustrates an example in which a noise reduction process is additionally performed.

2. First Embodiment

Figure 2:
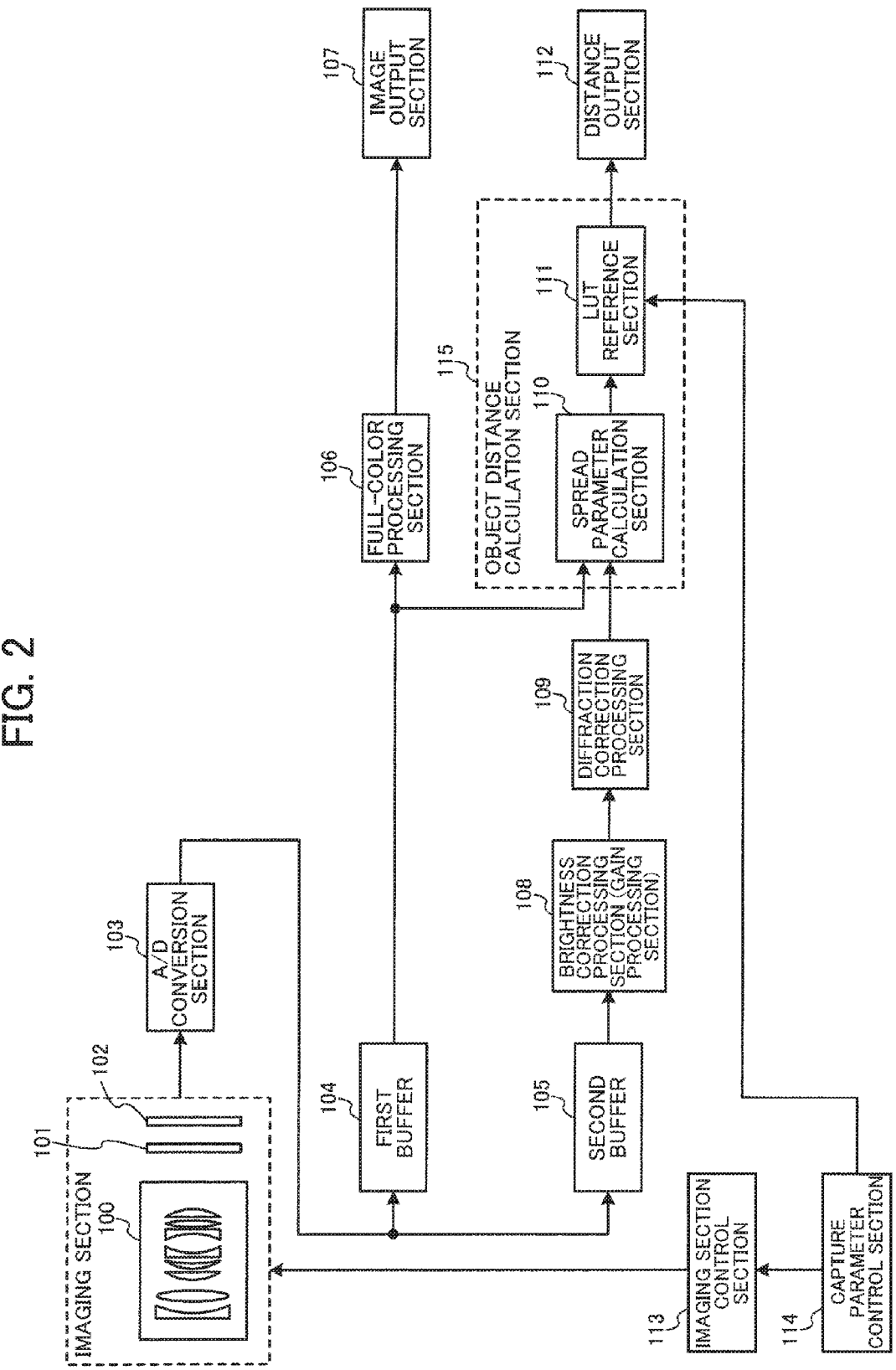
FIG. 2 illustrates a detailed configuration example of an imaging device according to several embodiments of the invention.

The first embodiment is described below. As illustrated in FIG. 2, an imaging device according to the first embodiment includes an imaging lens 100, a first image sensor 101, a second image sensor 102, an A/D conversion section 103, a first buffer 104, a second buffer 105, a full-color processing section 106, an image output section 107, a brightness correction processing section 108 (gain processing section), a diffraction correction processing section 109, a spread parameter calculation section 110, an LUT reference section 111, a distance output section 112, an imaging section control section 113, and a capture parameter control section 114. Note that the configuration of the imaging device is not limited to the configuration illustrated in FIG. 2. Various modifications may be made, such as omitting some of the elements illustrated in FIG. 2, or adding other elements. Various modifications may also be made in connection with FIG. 12 and the like.

Figure 4:
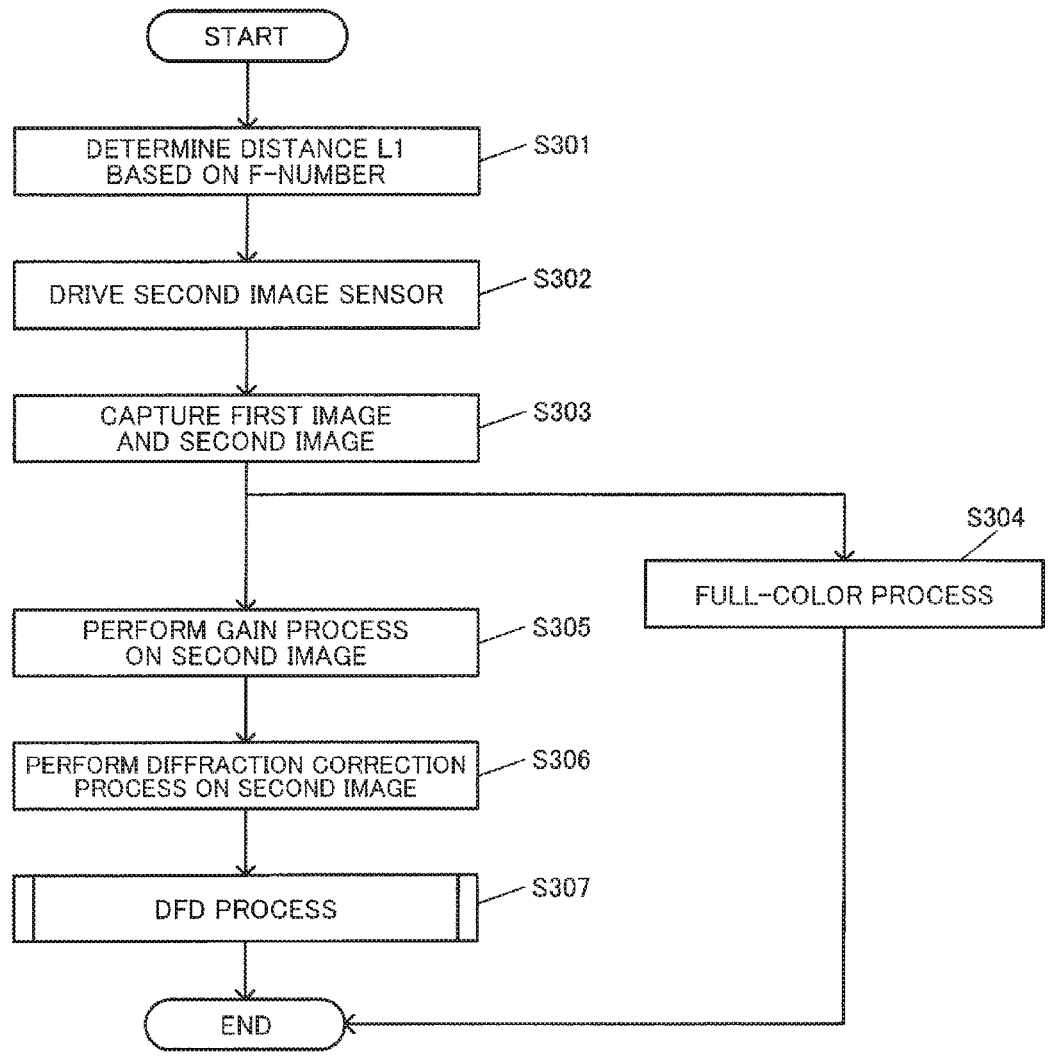
FIG. 4 is a flowchart illustrating a process (first embodiment).

The process performed by each block illustrated in FIG. 2 is described below referring to the flow of the process illustrated in FIG. 4. The first image sensor 101 and the second image sensor 102 must be provided so that a recognizable difference in amount of defocus occurs between the first image sensor 101 and the second image sensor 102 in order to implement DFD. The distance L1 between the image sensors is determined to satisfy the following expression (1) (S301).

$$L1 > 2Fr \quad (1)$$

Figure 7:
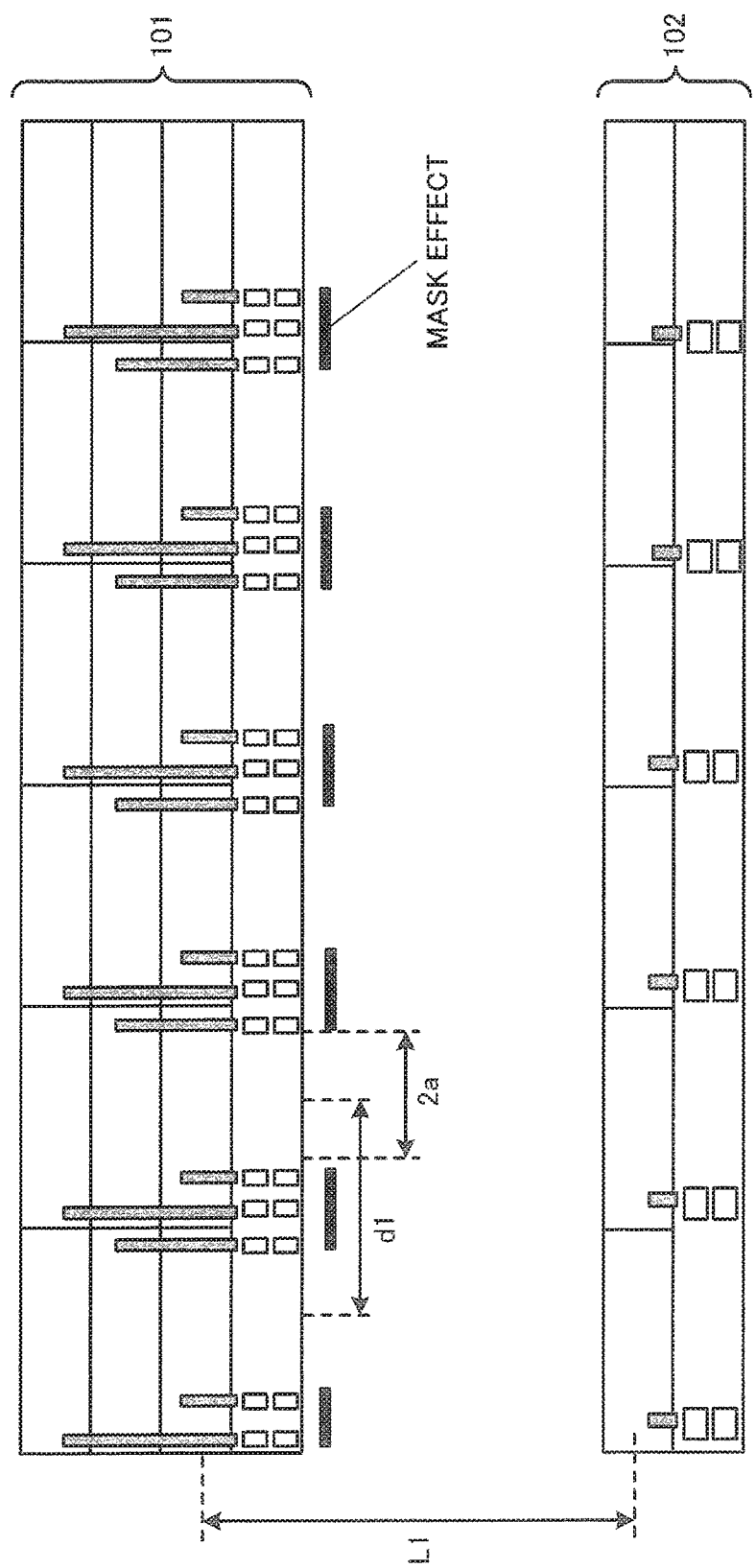
FIG. 7 is a view illustrating a state in which a first image sensor functions as a diffraction grating.

Note that F in the expression (1) is the F-number of the imaging lens 100, and r in the expression (1) is the diameter of the permissible circle of confusion. In the first embodiment, the permissible circle of confusion corresponds to the size of one pixel. Therefore, when the pixel pitch is set to d1 (see FIG. 7), the diameter r of the permissible circle of confusion is d1 (r=d1). The right side of the expression (1) represents the depth of focus φ illustrated in FIG. 3B. The distance L1 is set to satisfy the expression (1) so that a situation in which both the first image sensor 101 and the second image sensor 102 lie within the depth of focus does not occur. It is considered that an in-focus image is obtained within the range of the depth of focus φ even when the incident light does not optically converge at one point. Specifically, when both the first image sensor 101 and the second image sensor 102 lie within the depth of focus φ, a difference in the amount of defocus does not occur between the first image sensor 101 and the second image sensor 102, and it is difficult to appropriately implement DFD. The expression (1) represents the condition that is set from the above point of view. Specifically, at least a difference in the amount of defocus occurs between the image sensors by providing the image sensors to be situated away from each other by the distance L1.

The distance L1 increases as the F-number increases (see the expression (1)). In the first embodiment, the imaging section control section 113 illustrated in FIG. 2 drives the image sensor each time the capture parameter control section 114 illustrated in FIG. 2 has set the F-number to adjust the distance L1 (S302). The positions of the image sensors may be fixed using the distance L1 that satisfies the expression (1) when the maximum F-number that can be set in advance is used.

The light that has passed through the imaging lens 100 is captured using the first image sensor 101 and the second image sensor 102 that differ in the optical path length from the object (S303).

The first image sensor 101 and the second image sensor 102 are placed in layers in the direction along the optical axis, and the second image sensor 102 captures the light that has passed through the first image sensor 101. In the first embodiment, an image sensor that can record RGB (3 ch) information on a pixel basis (see FIG. 3A) is used as the first image sensor 101. Silicon layers 201, 202, and 203 are formed in the image sensor, and the incident light is subjected to color separation in the depth direction by utilizing the characteristics in which light having a longer wavelength reaches a deeper part of the silicon layer.

The layer 201 absorbs light (207) within a wavelength band that corresponds to Bch, light (208) within a wavelength band that corresponds to Gch, and light (209) within a wavelength band that corresponds to Rch included in the incident light. The light within a wavelength band that corresponds to Bch does not reach the layer 202, and the layer 202 absorbs the light (208) within a wavelength band that corresponds to Gch, and the light (209) within a wavelength band that corresponds to Rch. The deepest layer 203 absorbs the light (209) within a wavelength band that corresponds to Rch. The charge acquired by each layer is transmitted to a substrate-wiring layer 204.

When the charge acquired by each layer is respectively referred to as I201, I202, and I203, the Bch signal can be calculated by removing the G component and the R component from the charge I201 using the charge I202. Likewise, the Gch signal can be calculated by removing the R component from the charge I202 using the charge I203. The Rch signal can be acquired from the charge I203. In the first embodiment, the full-color processing section 106 performs a process (full-color process) that calculates the RGB signals using the charges I201 to I203 (S304).

Light 210 that has passed through the layer 203 reaches a photodiode 205 of the second image sensor 102 that is situated at the distance L1 from the layer 203, and is converted into charge.

Figure 3A:
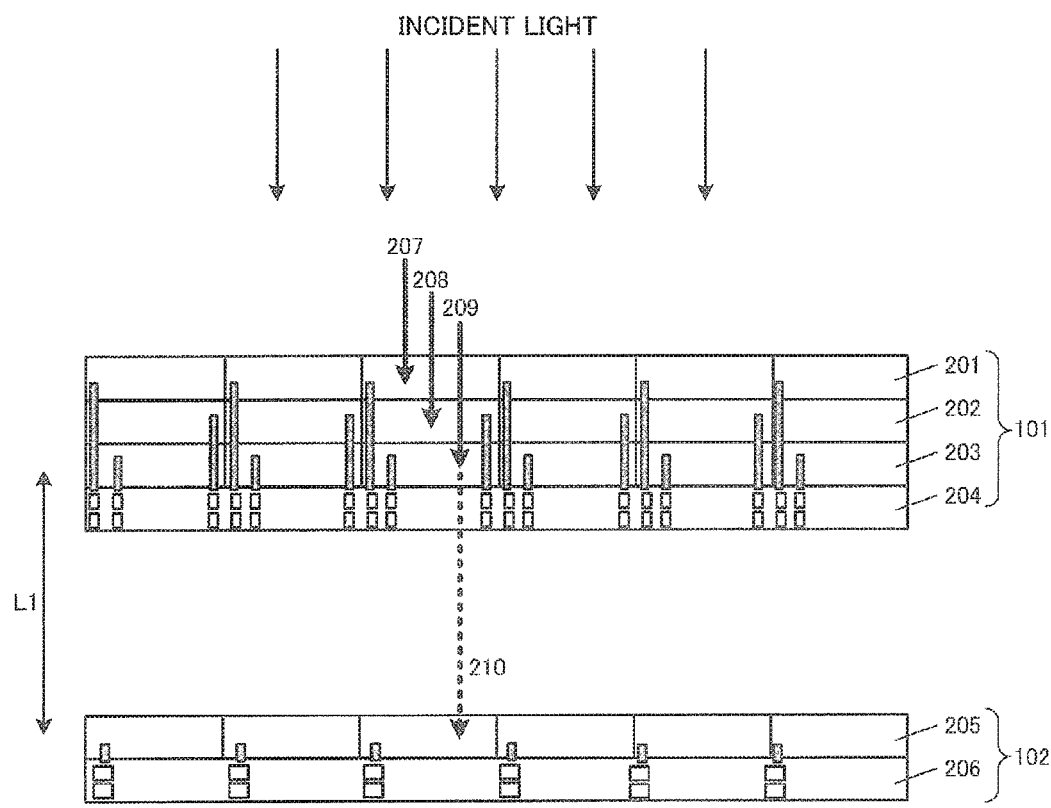
FIGS. 3A and 3B illustrate an example of the structure of an image sensor (first embodiment).
Figure 3B:
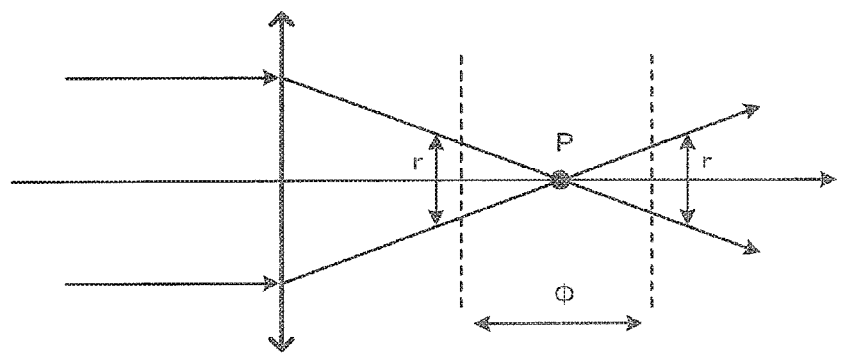
Figure 5:
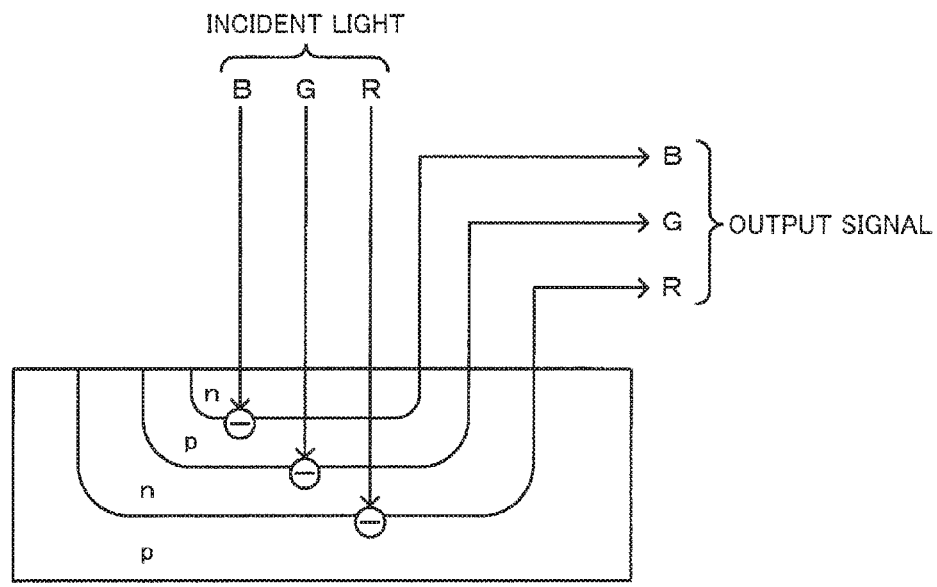
FIG. 5 illustrates a detailed configuration example of a direct image sensor.

Note that the first image sensor 101 may have a cross-sectional structure as illustrated in FIG. 5. In the illustrated in FIG. 5, an npn junction layer is formed on a p-type silicon substrate. A signal charge that corresponds to blue light, green light, and red light is generated in the np junction layer formed on the surface of the substrate, and a signal (I201) that includes a B signal, a G signal, and an R signal is output based on the signal charge. Likewise, a signal charge that corresponds to green light and red light is generated in the intermediate pn junction layer, and a signal (I202) that includes a G signal and an R signal is output based on the signal charge. A signal charge that corresponds to red light is generated in the deepest np junction layer, and a signal (I203) that includes an R signal is output based on the signal charge. The electrode and the wiring structure are illustrated in FIG. 3A and the like in a simplified manner, and a charge is generated at the junction between the n-type layer and the p-type layer as illustrated in FIG. 5.

Two images respectively acquired by the first image sensor 101 and the second image sensor 102 that differ in the amount of defocus are subjected to an A/D conversion process, and stored in the first buffer 104 and the second buffer 105, respectively. Specifically, a first image captured by the first image sensor 101 is stored in the first buffer 104, and a second image captured by the second image sensor 102 is stored in the second buffer 105.

In order to calculate the spread parameter (that represents the correlation in the amount of defocus) using the Rch information stored in the first buffer 104 and the image information stored in the second buffer 105, a given correction process is performed on the image information stored in the second buffer 105. The image information stored in the second buffer 105 represents the light that has passed through the first image sensor 101. Therefore, the images differ in brightness based on the spectral transmittance (i.e., the spectral transmittance of the layers 201 to 203 illustrated in FIG. 3A in a narrow sense) of the first image sensor 101. The brightness correction processing section 108 amplifies each pixel value using a given gain in order to correct the difference in brightness (S305).

FIG. 6 illustrates the spectral transmittance of the first image sensor 101. FIG. 6 illustrates the intensity of the transmitted light with respect to the incident light that has entered the first image sensor 101 using a wavelength axis. The transmittance of light having a wavelength that corresponds to the B signal (see A3 in FIG. 6) is close to 0% since the light is mainly absorbed by the layer 201. Likewise, the transmittance of light having a wavelength that corresponds to the G signal (see A4) is close to 0% since the light is mainly absorbed by the layer 202. The transmittance of light having a wavelength that corresponds to the R signal (see A5) is more than 0% and less than 100% since the light is mainly absorbed by the layer 203, but the incident light is not completely absorbed by the layer 203. Therefore, the part of the R signal indicated by A1 corresponds to the light absorbed by the first image sensor 101, and the part of the R signal indicated by A2 corresponds to the light that has passed through the first image sensor 101. Note that the effects of scattering and the like are not taken into consideration.

Even if the light that has passed through the first image sensor 101 has been completely absorbed by the second image sensor 102, the intensity of the light corresponds to the area indicated by A2. On the other hand, light having an intensity that corresponds to the area indicated by A1 has been absorbed by the first image sensor 101. Therefore, the second image is normally lower in brightness (brightness value) than the first image.

Since an image that has a small brightness value over the entire area has low contrast, such an image is determined to have a larger amount of defocus as compared with an image that has a larger brightness value even if the degree of optical defocus is almost equal. As described above, the difference in the amount of defocus due to a factor other than the in-focus state results in a deterioration in DFD determination accuracy. In the first embodiment, the brightness correction process is performed that causes the brightness of the second image to be substantially identical to that of the first image. Specifically, a gain process is performed using the gain represented by the following expression (2). Note that T is a value obtained by averaging the spectral transmittance illustrated in FIG. 6 within a band that corresponds to Rch.

$$\text{Gain} = (100 - T)/T \quad (2)$$

The area indicated by A2 calculated by performing an integration process using FIG. 6 may be used as the value T in the expression (2), for example. In this case, the numerator "100−T" included in the right side of the expression (2) is a value that corresponds to the area indicated by A1.

A diffraction correction process is then performed on the image subjected to the gain process (S306). The effects of diffraction are described below with reference to FIGS. 7 to 9D. When light passes through the first image sensor 101, an area of the substrate in which a wire (line) and the like are provided functions as a mask (see FIG. 7). Since the slits (aperture) (through which the light passes) and the masks are provided periodically on a pixel basis, the first image sensor 101 is considered to be a diffraction grating having slits 2a at slit intervals of d1.

Figure 8:
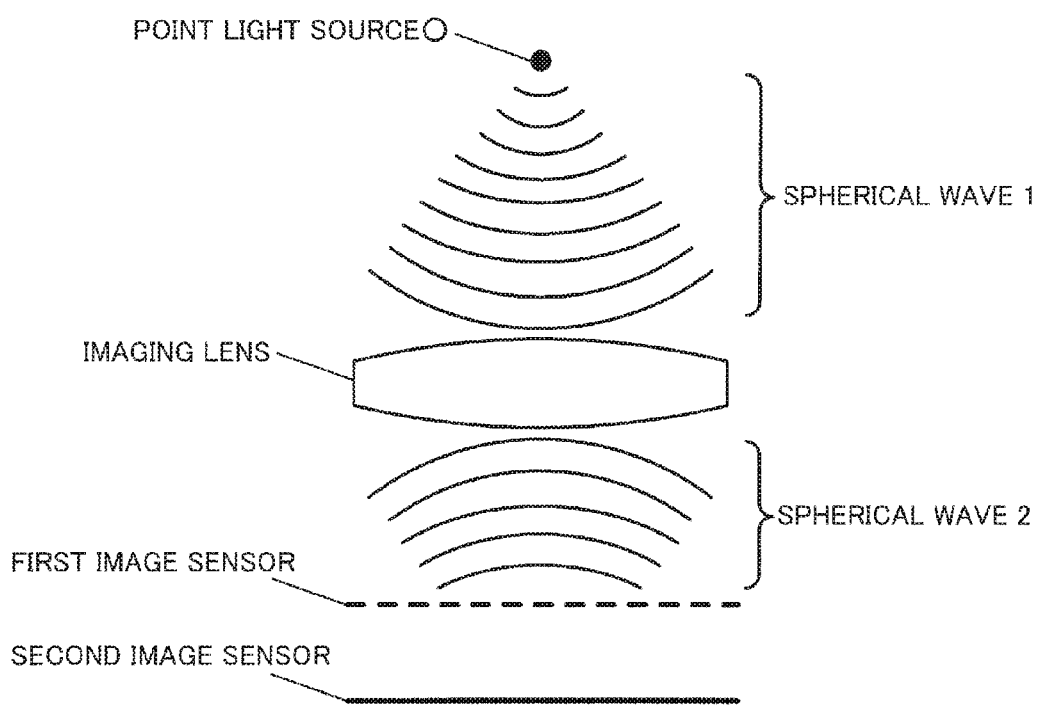
FIG. 8 is a view illustrating wave-front propagation.

FIG. 8 illustrates a state in which light emitted from a point O (point light source) reaches the first image sensor 101 (e.g., diffraction grating) through the imaging lens 100. Light having a given wavelength emitted from the point light source O forms a spherical wave (spherical wave 1), and reaches the imaging lens 100. The spherical wave 1 is modulated in phase by the imaging lens 100 to form a converging spherical wave (spherical wave 2), which reaches the first image sensor 101.

Figure 9A:
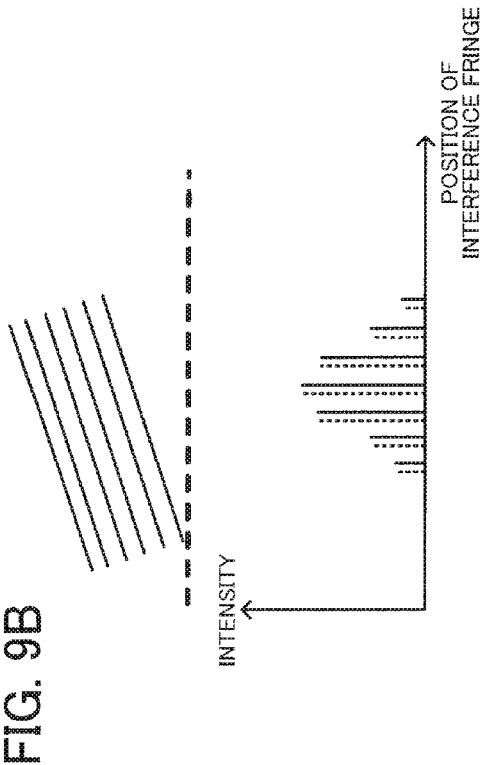
FIGS. 9A to 9D illustrate a specific example of a diffraction pattern.

FIGS. 9A to 9D illustrate a state in which the converging spherical wave is captured by the second image sensor 102. A spherical wave is considered to be a wave in which plane waves that differ in the incident angle overlap each other. Therefore, when the spherical wave is analyzed using the image of each plane wave that forms the spherical wave, the interference fringes illustrated in FIG. 9A are observed for the plane waves that are perpendicularly incident on the image sensor. A point image having an intensity I(m) is formed in the image plane at intervals of a distance mx around a point image having an intensity I(0) that is formed on a straight line that connects the point light source O and the center of the lens. The intensity I(m) and x are represented by the following expression (3). Note that m is a positive integer, N is the number of slits on the first image sensor, and λ is the wavelength of light.

$$I(mx) = I(0)\left\{\frac{\sin(\pi N d_1 x/\lambda L_1)}{\sin(\pi d_1 x/\lambda L_1)}\right\}^2 \left\{\frac{\sin(2\pi a x/\lambda L_1)}{2\pi a x/\lambda L_1}\right\} \quad (3)$$

$$x = \frac{m\lambda L_1}{d_1}$$

Figure 9C:
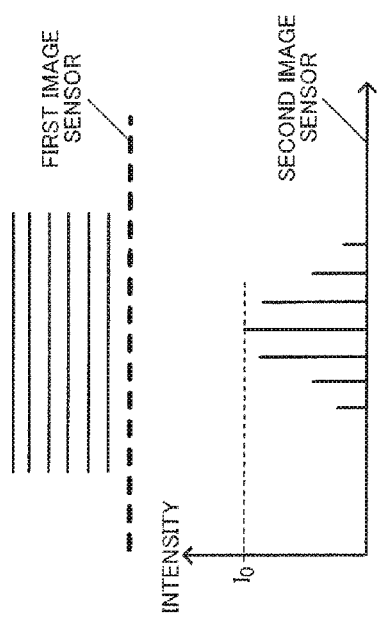
Figure 9B:
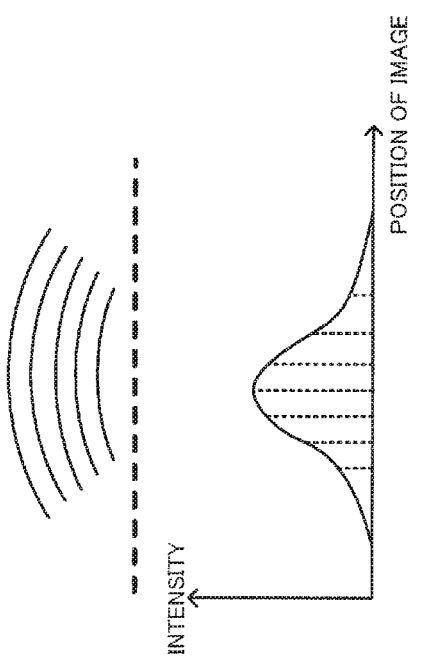
Figure 9D:
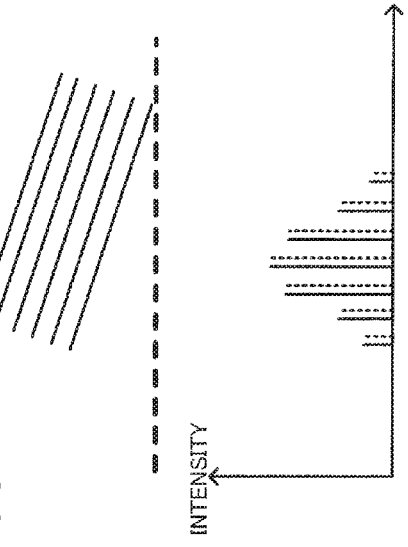

The interference fringes observed for the plane waves incident on the image sensor as illustrated in FIG. 9B are shifted to the right relative to the interference fringes illustrated in FIG. 9A (indicated by the dotted lines). The amount of shift increases as the incident angle increases. Likewise, the interference fringes observed for the plane waves incident on the image sensor as illustrated in FIG. 9C are shifted to the left relative to the interference fringes illustrated in FIG. 9A (indicated by the dotted lines). A point image distribution having a smooth slope (see the solid line illustrated in FIG. 9D) is obtained by integrating these effects with respect to each incident angle. Since the point image distribution is convoluted into the original defocus image, a process that corrects the dispersion of the point image distribution illustrated in FIG. 9D is performed on the image subjected to the gain process. The diffraction correction processing section 109 performs a convolution process on the image subjected to the gain process using an inverse filter calculated in advance from the point spread function.

Note that the point spread function may be calculated by integrating the expression (3) with respect to each wavelength and each incident angle, or may be may be empirically acquired by actually capturing the point light source. The inverse filter can be calculated from the point spread function using various methods (e.g., Wiener filter). Note that the calculation cost increases when the number of taps of the designed inverse filter is too large. Therefore, it is preferable to set the number of taps to about 6× in order to use about m=3 for the filter kernel.

Figure 10:
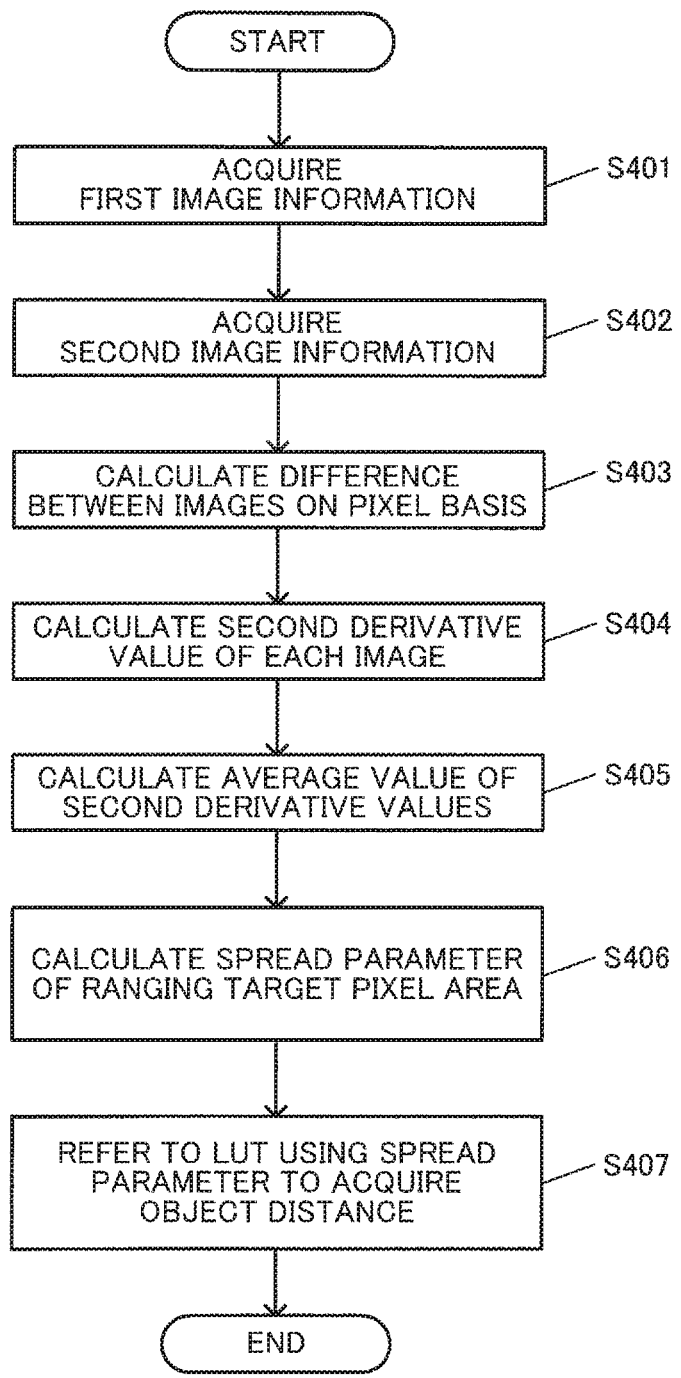
FIG. 10 is a flowchart illustrating a DFD process.

The object distance is then calculated by applying DFD (S307). The object distance calculation process is described below with reference to the flowchart illustrated in FIG. 10 and FIGS. 11A and 11B. In the first embodiment, the method described in Subbarao and G. Surya, "Depth from Defocus: A Spatial Domain Approach", International Journal of Computer Vision, Vol. 13, No. 3, pp. 271-294, 1994 may be used, for example. Specifically, the Rch image information stored in the first buffer 104 is acquired as the first image (S401), and the corrected image information (see above) is acquired as the second image (S402). The difference between the images is calculated on a pixel basis (S403). The second derivative value of each image is calculated (S404), and the average value thereof is calculated (S405). The following expression (4) is solved using the calculated difference (numerator) and the average second derivative value (denominator) to calculate the spread parameter G that represents the correlation between the amounts of defocus (S406).

$$G(x, y) = \sigma_1^2 - \sigma_2^2 = \frac{4(g_1(x, y) - g_2(x, y))}{(\nabla g_1(x, y) + \nabla g_2(x, y))/2} \quad (4)$$

Note that g1 is the first image information, g2 is the second image information, and (x, y) is the coordinates within each image. ∇g1 is the second derivative value of the first image information, and ∇g2 is the second derivative value of the second image information. σ1 is the amount of defocus of the first image, and σ2 is the amount of defocus of the second image. The spread parameter G is an expression that calculates the difference in the amount of defocus between the first image and the second image. According to the method described in Subbarao and G. Surya, "Depth from Defocus: A Spatial Domain Approach", International Journal of Computer Vision, Vol. 13, No. 3, pp. 271-294, 1994, the spread parameter can be calculated from the first image information g1, the second image information g2, and the second derivative values thereof without directly calculating the amount of defocus (see the expression (4)).

The spread parameter is calculated by the spread parameter calculation section 110. The LUT reference section 111 refers to a look-up table (LUT) that stores the spread parameter and the object distance u on a one-to-one basis to calculate the object distance u (S407).

Figure 11A:
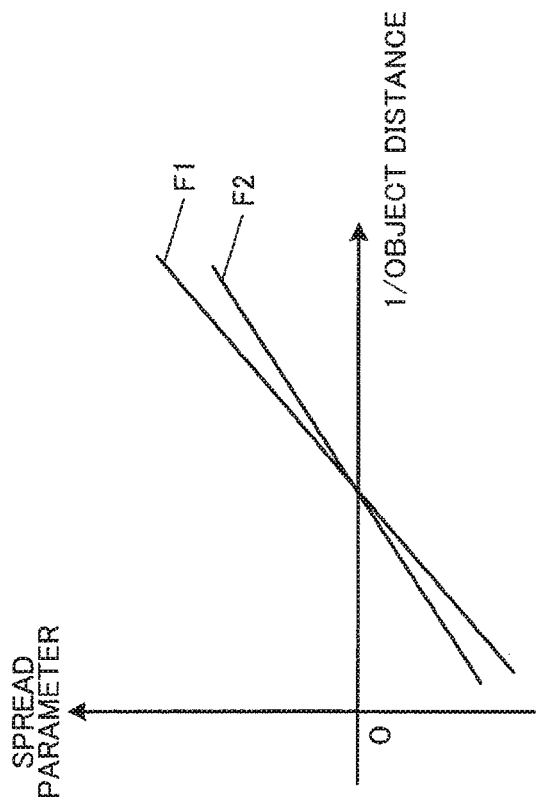
FIGS. 11A and 11B illustrate an example of the relationship between a spread parameter and an object distance.
Figure 11B:
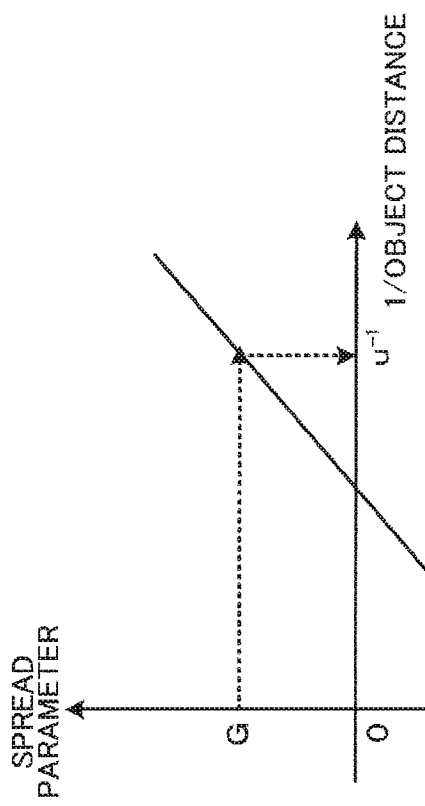

FIGS. 11A and 11B illustrate the relationship between the spread parameter and the object distance. FIG. 11A illustrates that the reciprocal of the object distance and the spread parameter have a linear relationship. Since the slope of the function changes (F1<F2) (see FIG. 11B) due to a change in F-number, it is necessary to provide a table corresponding to the F-number. Note that the spread parameter may be calculated using the following expression (5) without using the table. Note that α in the expression (5) is the slope that changes depending on the F-number, and β is the intercept.

$$G=\alpha u^{-1}+\beta \quad (5)$$

It is possible to eliminate the effects of the difference in brightness and diffraction from the image information obtained by the second image sensor 102 by utilizing the method according to the first embodiment, and implement one-shot DFD with high accuracy using a compact space.

According to the first embodiment, the first image sensor 101 is a direct image sensor that sequentially separates the RGB colors in the direction along the optical axis of the imaging lens 100.

Note that the term "direct image sensor" used herein refers to a sensor that sequentially separates a color (i.e., RGB (primary colors)) in the travel direction of light. For example, silicon may be for the photoelectric conversion section (as described above with reference to FIG. 5). Note that an image sensor that includes a photoelectric conversion section in which three organic photoconductive films (that have R, G, or B sensitivity and allow the other colors to pass through) are stacked, may be used as the direct image sensor. Various other modifications may also be made.

This makes it possible to use a direct image sensor as the first image sensor 101. The direct image sensor has a configuration in which the wavelength band of light absorbed by each layer differs from each other (see above). This configuration is implemented by determining the light absorption characteristics and the light transmission characteristics of each layer during the design stage. Specifically, it is possible to control (design) the wavelength band and the intensity of light that passes through the first image sensor 101 (i.e., light that is received by the second image sensor 102) by utilizing a direct image sensor as the first image sensor 101. Therefore, since it is possible to easily adjust the intensity of light that is absorbed by the second image sensor 102, and easily adjust the clarity of the second image, the method according to the first embodiment that implements DFD using the configuration illustrated in FIG. 1 has high affinity to the direct image sensor.

As illustrated in FIG. 2, the imaging device may further include the brightness correction processing section 108 that performs the brightness correction process that amplifies the pixel value of the second image captured by the second image sensor 102 using the gain that has been set based on the light transmittance of the light-receiving section of the first image sensor 101.

This makes it possible to cause the brightness (brightness value) of the second image to be substantially identical to that of the first image. When two images are almost equal in the amount of optical defocus, but differ in the overall brightness value, the image having a larger brightness value has higher contrast as compared with the image having a smaller brightness value, and it is determined that the image having a larger brightness value has a small amount of defocus, and the image having a smaller brightness value has a large amount of defocus (see above). Since the difference in the amount of defocus between the images due to the brightness of the entire image is eliminated by performing the brightness correction process to obtain the first image and the second image that have identical brightness, it is possible to appropriately calculate the difference in the amount of optical defocus between the first image and the second image, and improve the accuracy of the DFD process.

When the difference in brightness between the first image and the second image is known in advance, the LUT may be provided taking account of the difference in brightness. In this case, the slope α (see FIGS. 11A and 11B) and the intercept β are calculated taking account of the difference in brightness. This makes it possible to compensate for the effects of brightness when converting the spread parameter into the object distance, even if the spread parameter is calculated without performing the brightness correction process. For example, when the transmittance characteristics of the first image sensor 101 (see FIG. 6) are known during the design stage, the LUT may be determined based on the transmittance characteristics.

As illustrated in FIG. 2, the imaging device may further include the diffraction correction processing section 109 that performs the process that corrects defocus caused by diffraction due to the first image sensor 101 on the second image captured by the second image sensor 102.

According to this configuration, even when defocus that differs from defocus due to the difference in optical path length has occurred in the second image due to the diffraction grating formed by the first image sensor 101, it is possible to correct the defocus, and appropriately calculate the defocus due to the difference in optical path length (i.e., the difference in focus state). When defocus due to diffraction can be calculated in advance, the LUT may be provided taking account of the effects of defocus due to diffraction. In this case, the diffraction correction processing section 109 can be omitted from the imaging device, and the diffraction correction process can be skipped.

When the F-number determined by the lens system that includes the imaging lens 100 is referred to as F, and the size of the permissible circle of confusion is referred to as r, the second image sensor 102 is placed at a given distance L that satisfies L>F×r from the first image sensor 101 in the direction along the optical axis of the imaging lens 100.

According to this configuration, since it is possible to avoid a situation in which both the first image sensor 101 and the second image sensor 102 lie within the depth of focus (see above), it is possible to cause a difference in the amount of defocus to occur between the first image and the second image. This makes it possible to accurately calculate the spread parameter, and improve the accuracy of the object distance calculated by the DFD process.

Figure 19A:
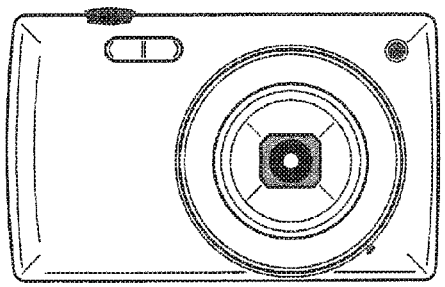
FIGS. 19A to 19C illustrate an example of a specific device to which a method according to several embodiments of the invention may be applied.
Figure 19C:
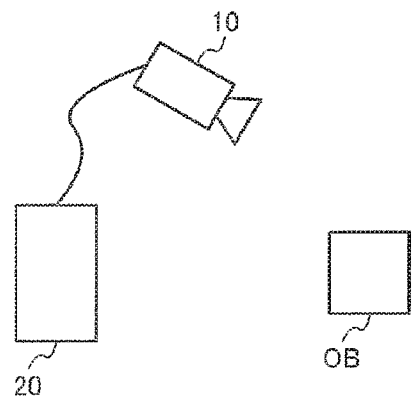
Figure 19B:
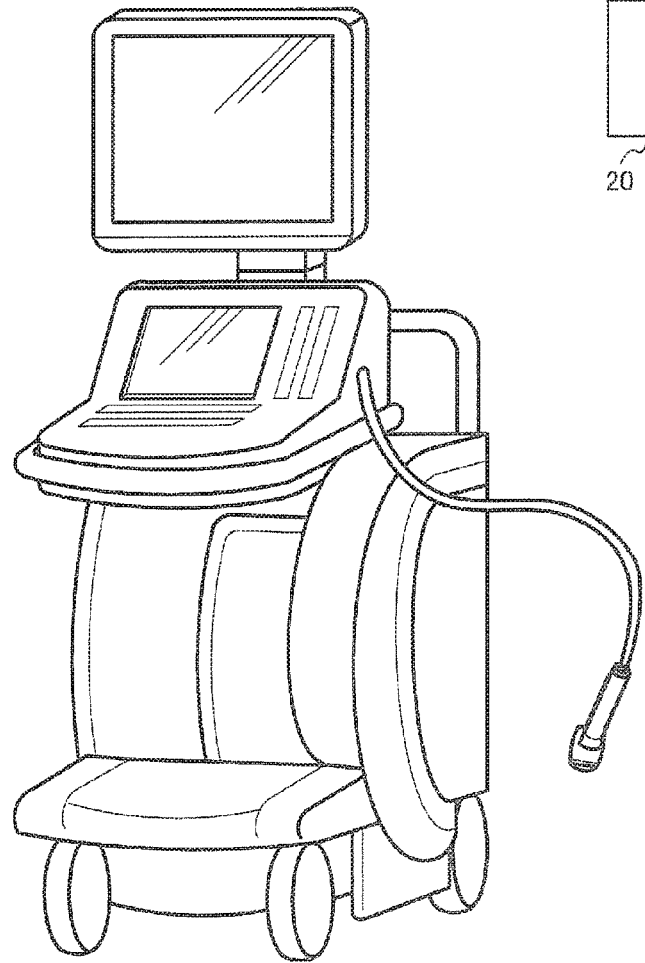

The first embodiment may also be applied to an electronic device that includes the imaging device. The first embodiment may be applied to a digital camera (see FIG. 19A), an endoscope apparatus (see FIG. 19B), and various other devices that utilize distance information about the distance to the object. When applying the first embodiment to the endoscope apparatus illustrated in FIG. 19B, an image captured by an imaging section (corresponding to the color image generated by the full-color processing section 106 illustrated in FIG. 2) may be displayed after performing image processing that utilizes the distance information on the image. Examples of the image processing include an enhancement process that enhances the object situated at a specific distance to improve the visibility of the object, and the like. The electronic device according to the first embodiment may be a device that includes a control device 10 (e.g., PC) and an imaging section 20 (see FIG. 19C). In this case, the imaging section 20 acquires the first image and the second image using the configuration illustrated in FIG. 1 or the like, and the control device 10 performs the DFD process to calculate the distance information about the distance to an object OB. The control device 10 performs various processes that utilize the distance information. For example, the control device 10 may perform a process that determines the shape and the size of the object OB in the direction orthogonal to the optical axis using the color image, and determines information about the object OB in the direction along the optical axis using the distance information to generate a 3D model of the object OB. Specifically, the method according to the first embodiment can be applied to various electronic devices that utilize the distance information.

The imaging device according to the first embodiment includes a memory that stores information (e.g., program and various types of data), and a processor that operates based on the information stored in the memory. The imaging device includes a first image sensor that is placed to intersect the optical axis of an imaging lens, and captures a first image, a second image sensor that is placed to intersect the optical axis of the imaging lens so as to be situated at a given distance from the first image sensor, and receives light that has passed through the first image sensor to capture a second image, and a processor including hardware, wherein the processor is configured to implement a brightness correction process that amplifies the pixel value of the second image captured by the second image sensor using a gain that has been set based on the light transmittance of a light-receiving section of the first image sensor, and an object distance calculation process that performs the DFD (depth-from-defocus) process based on the pixel value of the first image and the pixel value of the second image subjected to the brightness correction process to calculate the object distance, and the processor is configured to implement the brightness correction process that causes the brightness of the second image to be substantially identical to that of the first image.

The processor may implement the function of each section by individual hardware, or may implement the function of each section by integrated hardware, for example. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an application specific integrated circuit (ASIC). The memory may be a semiconductor memory (e.g., SRAM or DRAM), a register, a magnetic storage device (e.g., hard disk drive), or an optical storage device (e.g., optical disk device). For example, the memory stores a computer-readable instruction, and each section of the image processing device is implemented by causing the processor to execute the instruction. The instruction may be an instruction included in an instruction set that is included in a program, or may be an instruction that causes a hardware circuit included in the processor to operate.

The operation according to the first embodiment is implemented as described below, for example. The memory stores the first image captured by the first image sensor, and the second image captured by the second image sensor. The processor reads the second image from the memory, performs the brightness correction process on the second image, and writes the second image subjected to the brightness correction process into the memory. The processor reads the first image and the second image subjected to the brightness correction process from the memory, performs the DFD process to calculate the object distance, and writes the calculated object distance into the memory.

Each section of the imaging device according to the first embodiment is implemented as a module of a program that operates on the processor. For example, the brightness correction processing section is implemented as a brightness correction processing module that amplifies the pixel value of the second image captured by the second image sensor using the gain that has been set based on the light transmittance of the light-receiving section of the first image sensor. The object distance calculation section is implemented as an object distance calculation module that performs the DFD (depth-from-defocus) process based on the pixel value of the first image and the pixel value of the second image subjected to the brightness correction process to calculate the object distance.

The imaging device and the like according to the first embodiment may include a processor and a memory. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an ASIC. The memory stores a computer-readable instruction. Each section of the imaging device and the like according to the first embodiment is implemented by causing the processor to execute the instruction. The memory may be a semiconductor memory (e.g., SRAM or DRAM), a register, a hard disk, or the like. The instruction may be an instruction included in an instruction set that is included in a program, or may be an instruction that causes a hardware circuit included in the processor to operate.

3. Second Embodiment

Figure 12:
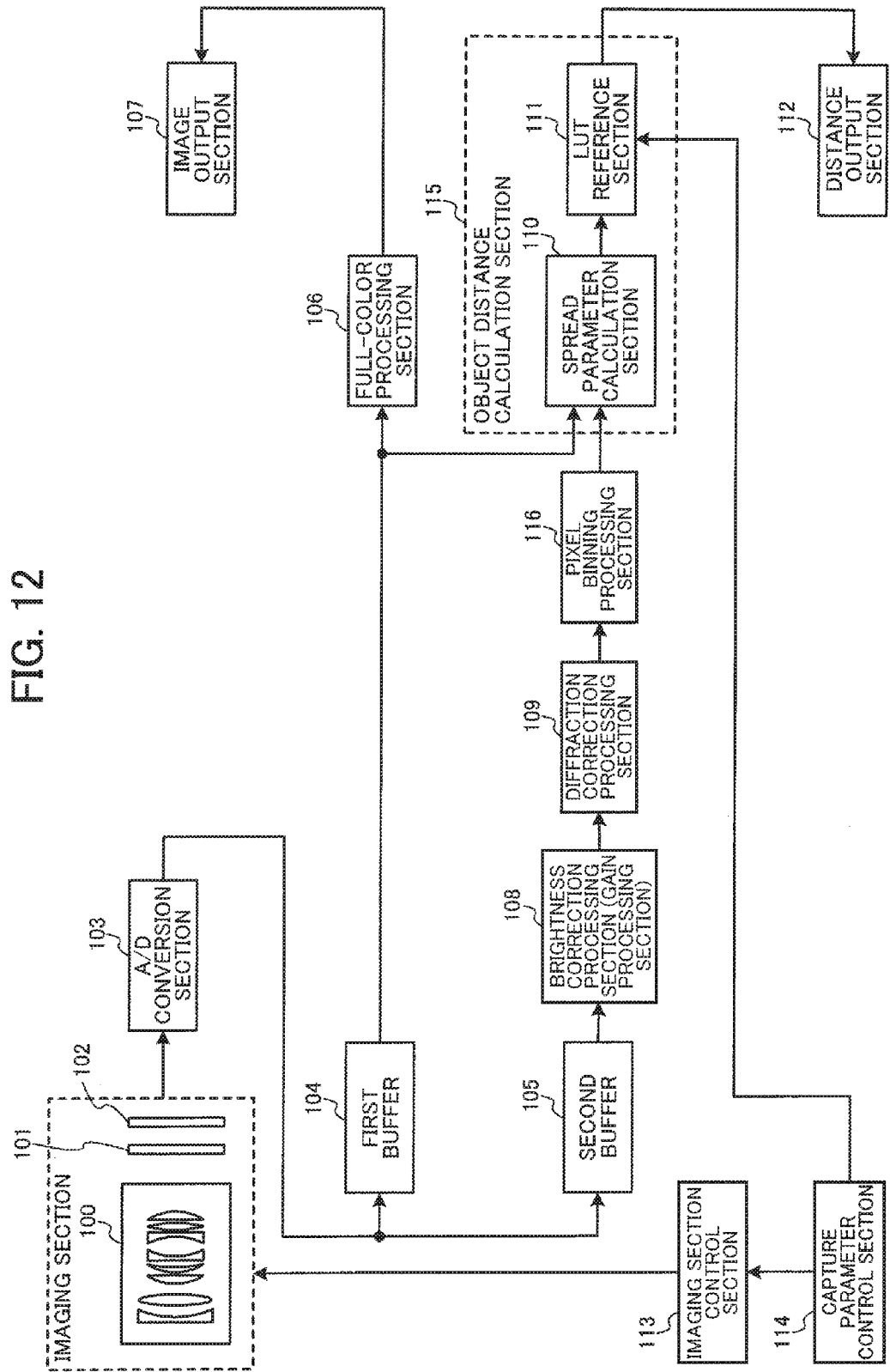
FIG. 12 illustrates another configuration example of an imaging device according to several embodiments of the invention.

The second embodiment is described below. Note that description of the elements of the imaging device according to the second embodiment (see FIG. 12) that are the same as those described above in connection with the first embodiment is omitted, and the differences from the features described above in connection with the first embodiment are mainly described below. As illustrated in FIG. 12, the imaging device according to the second embodiment includes a pixel binning processing section 116 in addition to the configuration described above in connection with the first embodiment.

The configuration according to the second embodiment is described below taking an example in which the first image sensor 101 includes Bayer-array color filters (see FIG. 13).

Figure 13:
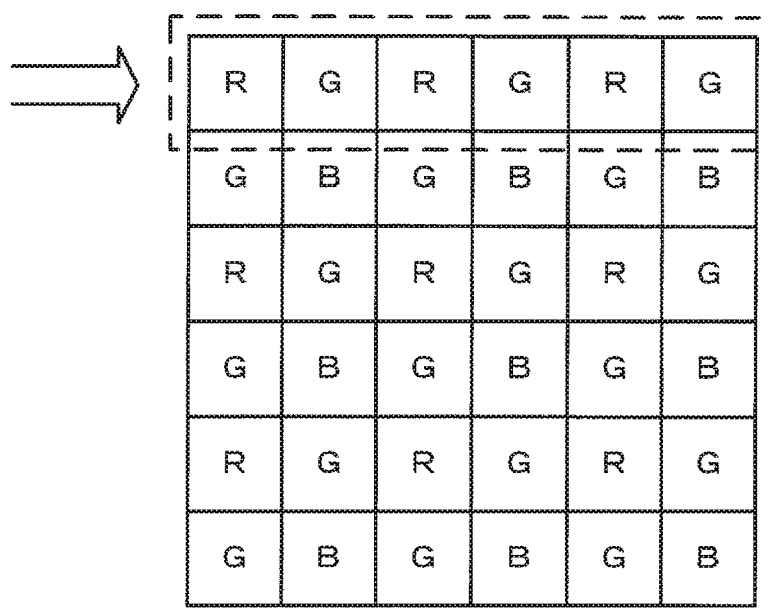
FIG. 13 illustrates a configuration example of a Bayer-array image sensor.
Figure 14:
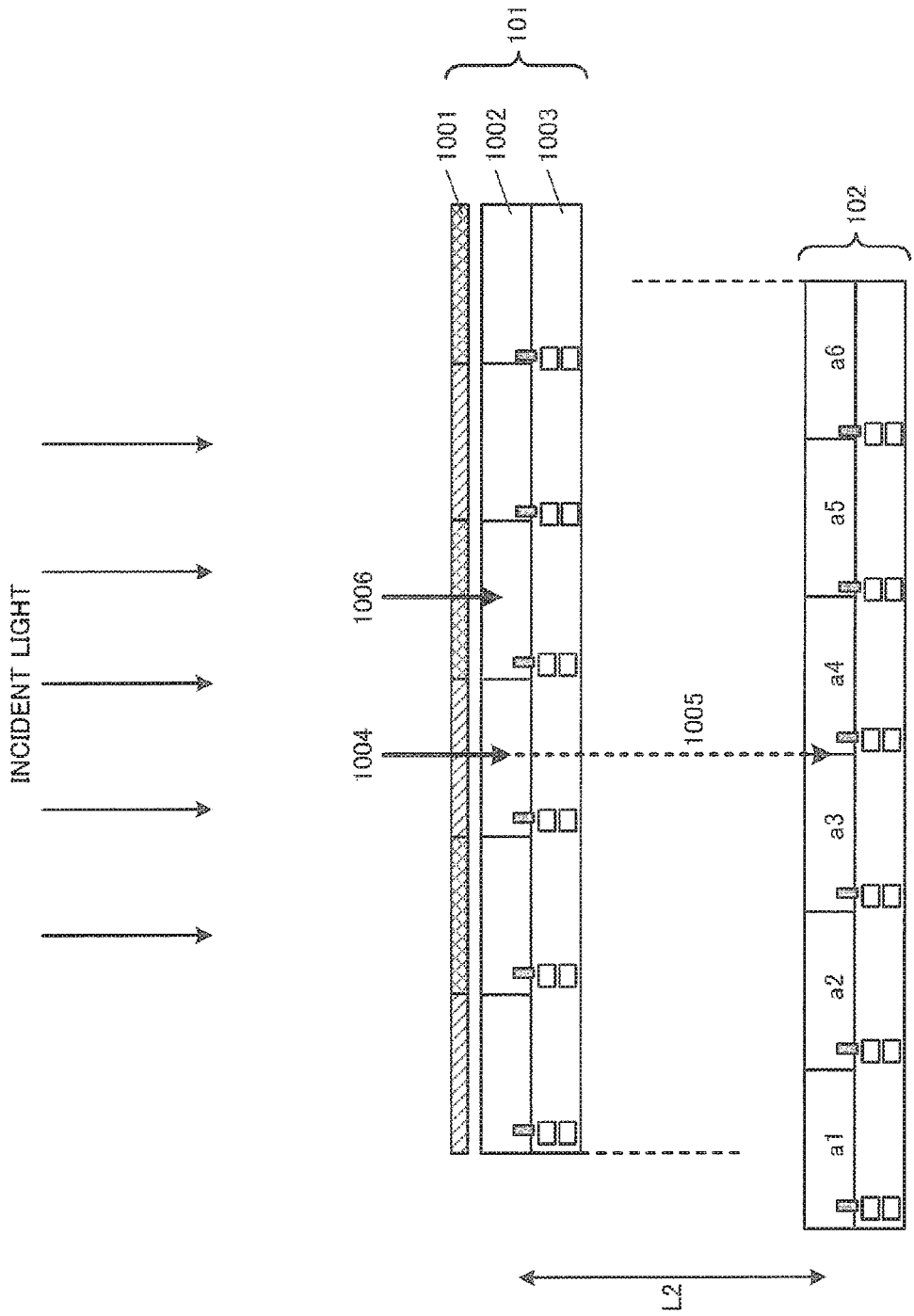
FIG. 14 illustrates an example of the structure of an image sensor (second embodiment).

FIG. 14 illustrates the structure and the arrangement of the first image sensor 101 and the second image sensor 102. FIG. 14 is a side view illustrating one row of the first image sensor 101 including the Rch pixels (see the arrow (dotted line) illustrated in FIG. 13). In FIG. 14, reference sign 1001 indicates a color filter, reference sign 1002 indicates a photodiode, and reference sign 1003 indicates a substrate and a wiring layer. As illustrated in FIG. 14, R color filters and G color filters are arranged alternately.

When a Bayer-array image sensor is used as the first image sensor 101, since light 1006 that is incident on a pixel (i.e., Bch pixel or Gch pixel) other than the Rch pixel enters the color filter that allows light having a wavelength that corresponds to the G signal or the B signal to pass through, the light having a wavelength that corresponds to the R signal (Rch pixel) is blocked by the color filter. The light that is incident on the Bch pixel or the Gch pixel is absorbed by the first image sensor 101 (in the same manner as described above in connection with the first embodiment). Therefore, the light that is incident on a pixel (i.e., Bch pixel or Gch pixel) other than the Rch pixel does not pass through the first image sensor 101 (i.e., is not absorbed by the second image sensor 102).

Regarding light 1004 that is incident on the Rch pixel, the light having a wavelength that corresponds to the G signal or the B signal is blocked by the color filter, and the light having a wavelength that corresponds to the R signal is absorbed by the first image sensor 101. In this case, part of the light having a wavelength that corresponds to the R signal passes through the first image sensor 101, and reaches the second image sensor 102. Specifically, the DFD process is performed using an image (R image) that corresponds to the Rch pixels of the first image sensor 101, and an image that corresponds to the light that has passed through the Rch pixels of the first image sensor 101, and has been received by the second image sensor 102.

Figure 15:
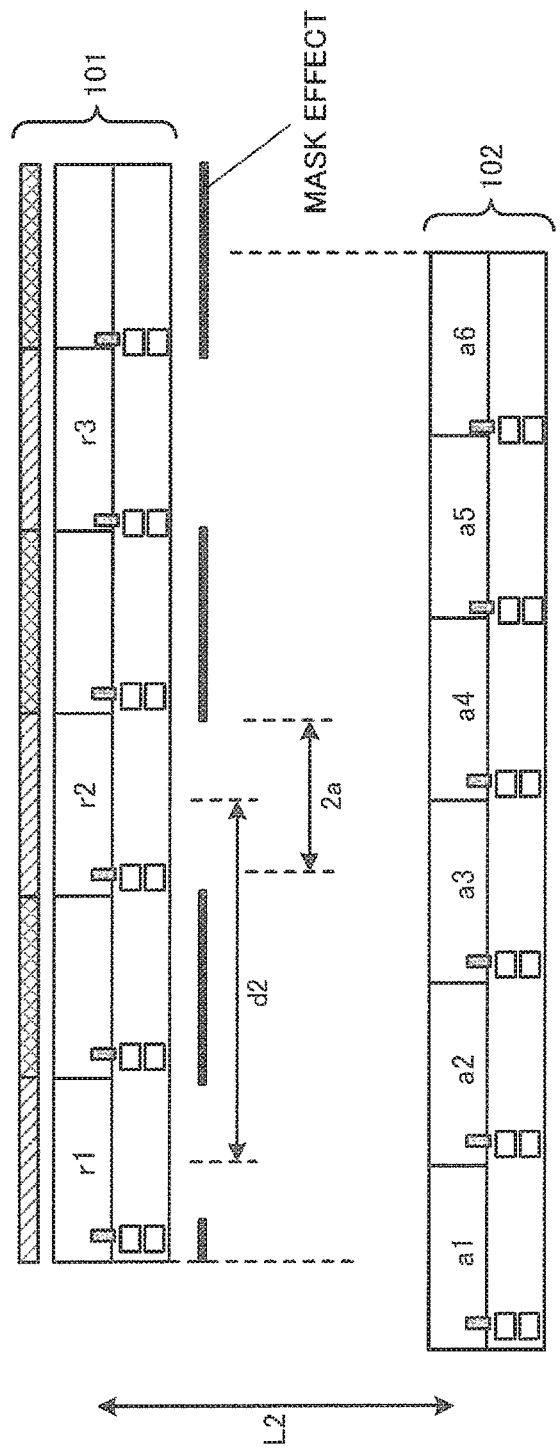
FIG. 15 is another view illustrating a state in which a first image sensor functions as a diffraction grating.

In this case, since the first image sensor 101 is configured so that the Rch color filters are arranged every other pixels (i.e., the sampling interval is set to one pixel) in the horizontal direction and the vertical direction (see FIG. 13), the diameter of the permissible circle of confusion necessary for calculating the conditions for determining the distance L2 between the first image sensor 101 and the second image sensor 102 is d2 (that corresponds to two pixels) (see FIG. 15). Specifically, the distance L2 between the first image sensor 101 and the second image sensor 102 used in connection with the second embodiment satisfies the following expression (6) obtained by substituting d2 for r in the expression (1).

$$L2 > 2Fd2 \quad (6)$$

Diffraction that occurs on the second image sensor 102 due to the diffraction grating formed by the first image sensor 101 is represented by the following expression (7).

$$I(mx) = I(0) \left\{ \frac{\sin(\pi N d_2 x / \lambda L_2)}{\sin(\pi d_2 x / \lambda L_2)} \right\}^2 \left\{ \frac{\sin(2\pi a x / \lambda L_2)}{2\pi a x / \lambda L_2} \right\} \quad (7)$$

$$x = \frac{m \lambda L_2}{d_2}$$

Note that the value x in the expression (7) is a parameter that represents the degree of spreading due to diffraction.

Therefore, the degree of spreading increases as the value x increases. The number of taps of the inverse filter used for the diffraction correction process increases (i.e., the processing load increases) as the degree of spreading increases. If the diffraction correction process is performed without increasing the number of taps, the accuracy of the diffraction correction process decreases. Since the value d2 is twice the value d1 used in connection with the first embodiment, the lower limit of the distance L2 increases to twice its value (see the expression (6)). Therefore, it may be considered that the value x (that is calculated using the expression in which the distance L2 is included in the numerator) increases as compared with the first embodiment. However, the value d2 is included in the expression used to calculate the value x (see the expression (7)). Specifically, the value (L2/d2) is almost equal to the value (L1/d1) used in connection with the first embodiment. That is, the value x (i.e., the degree of spreading due to diffraction) does not necessarily increases as the distance L2 increases. Therefore, it is considered that a large difference does not occur with regard to the diffraction correction process between the case of using a direct image sensor as the first image sensor 101 (first embodiment) and the case of using a Bayer-array image sensor as the first image sensor 101 (second embodiment). This also applies to the case where the Rch color filters (pixels) are arranged every two or more pixels (i.e., the sampling interval is set to two or more pixels) in the horizontal direction and the vertical direction.

The number of Rch pixels to be sampled by the first image sensor 101 must be identical to the number of pixels of the image acquired by the second image sensor 102 in order to implement DFD. When the ratio of the Rch pixels 1/4 (see FIG. 13), the ratio of the pixels of the first image sensor 101 that contribute to the R image used for DFD is 1/4. On the other hand, all of the pixels of the second image sensor 102 are normally used to generate the R image. In this case, when the first image sensor 101 and the second image sensor 102 are identical to each other as to the pixel pitch, the first image captured by the first image sensor 101 is smaller in the number of pixels than the second image captured by the second image sensor 102, and it is difficult to make an appropriate determination during DFD.

Figure 16:
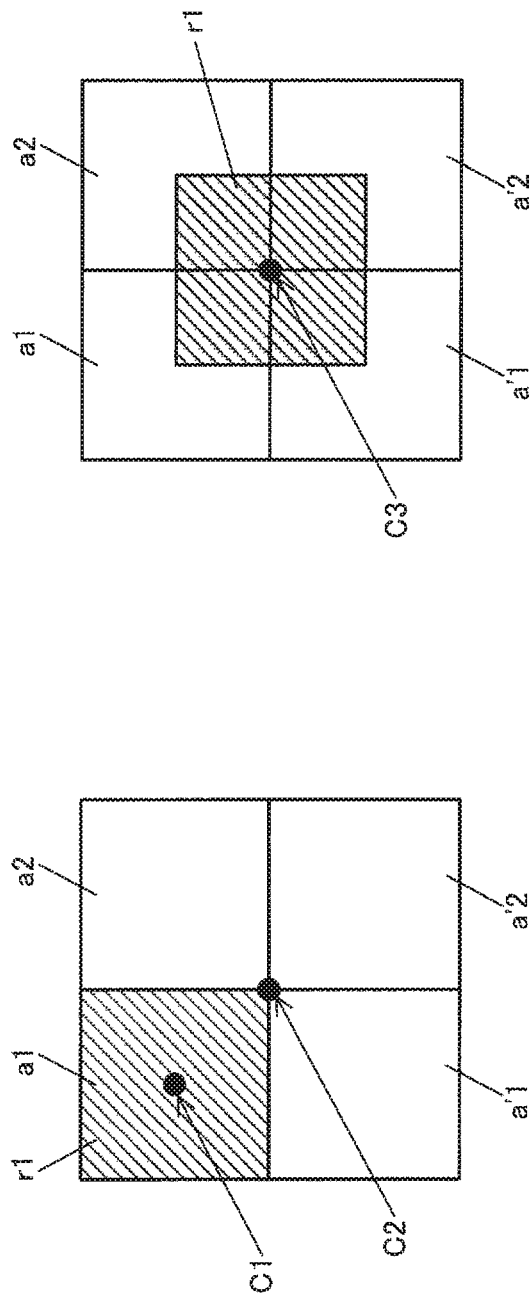
FIGS. 16A and 16B illustrate an example of the pixel positional relationship between a first image sensor and a second image sensor.

Therefore, the pixel binning processing section 116 illustrated in FIG. 12 averages the pixel values of the image captured by the second image sensor 102 in units of four pixels (i.e., two pixels in the horizontal direction, and two pixels in the vertical direction). The pixel binning process is described below with reference to FIG. 15. The pixels values of the pixels a1 and a2 are averaged as the pixels values of the pixels that correspond to the pixel r1 in the horizontal direction, the pixels values of the pixels a3 and a4 are averaged as the pixels values of the pixels that correspond to the pixel r2 in the horizontal direction, and the pixels values of the pixels a5 and a6 are averaged as the pixels values of the pixels that correspond to the pixel r3 in the horizontal direction. Average values are similarly calculated in the vertical direction. In this case, if the first image sensor 101 and the second image sensor 102 placed so that the pixel r1 coincides with the pixel a1 (see FIG. 16), the center C1 of the pixel r1 differs in position from the center C2 of the pixel obtained by performing the pixel binning process on the four pixels (a1, a2, a'1, a'2) of the second image sensor 102. Therefore, it is desirable to place the second image sensor 102 to be shifted by half pixel from the first image sensor 101 in the horizontal direction and the vertical direction (see FIGS. 14 and 15) so that the pixel positions of the first image sensor 101 coincide with the pixel positions of the second image sensor 102 after the pixel binning process. In this case, the center of the pixel of the first image sensor 101 and the center of the pixel of the second image sensor 102 coincide with each other at the point C3 illustrated in FIG. 16B.

The DFD process is then performed in the same manner as described above in connection with first embodiment using the R image (second image) captured by the second image sensor 102 that has been subjected to the pixel binning process, and the Rch sampling image (first image) captured by the first image sensor 101.

Figure 20:
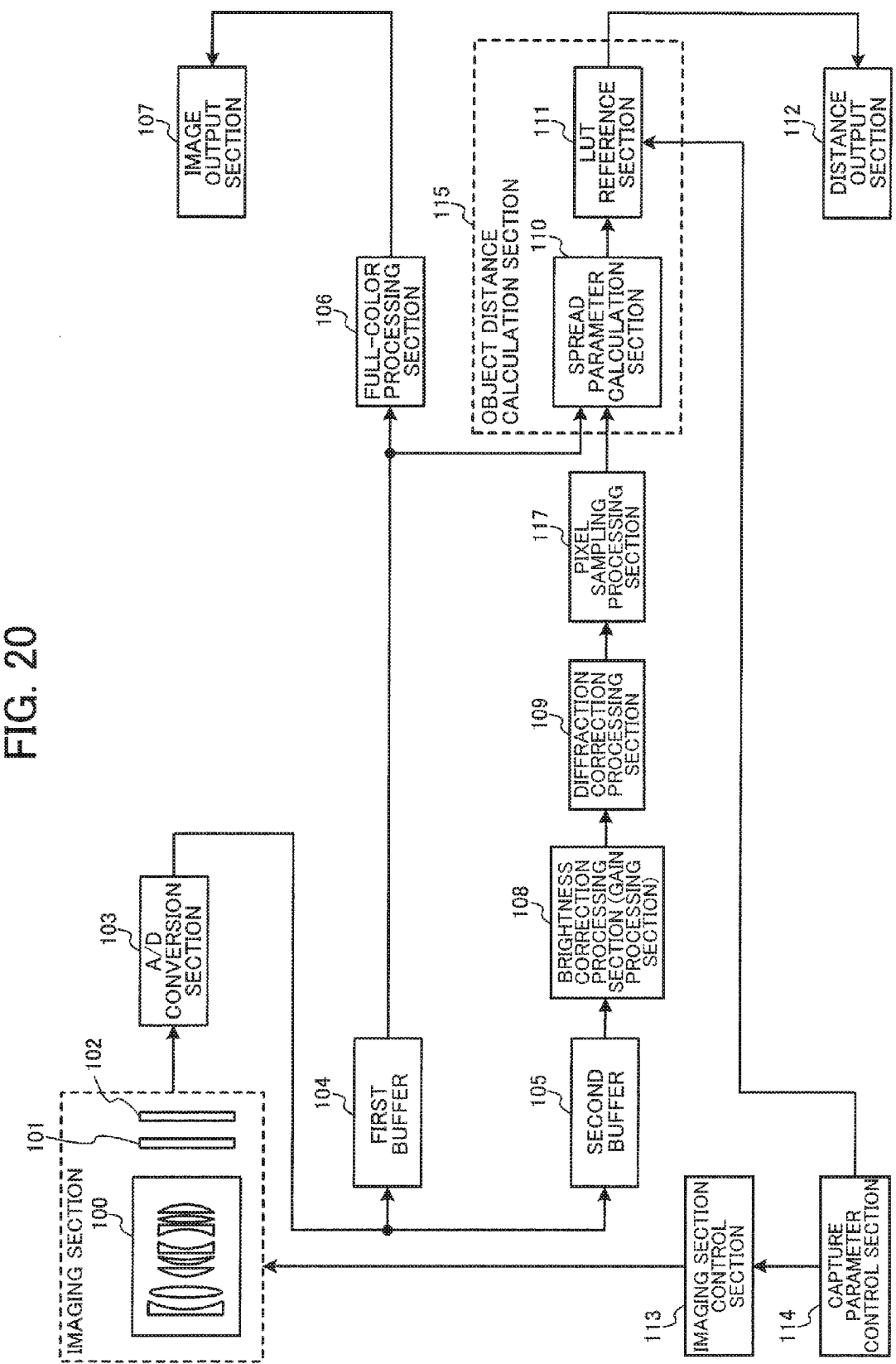
FIG. 20 illustrates another configuration example of an imaging device according to several embodiments of the invention.

Note that it is possible to make an appropriate determination during DFD as long as the number of pixels of the first image captured by the first image sensor 101 corresponds to (is identical to in a narrow sense) the number of pixels of the second image captured by the second image sensor 102. Specifically, the process that adjusts the number of pixels is not limited to the pixel binning process described above. For example, the imaging device according to the second embodiment may have the configuration illustrated in FIG. 20. In FIG. 20, the pixel binning processing section 116 illustrated in FIG. 12 is omitted, and a pixel sampling processing section 117 is additionally provided.

The term "pixel sampling process" used herein refers to a process that adjusts the number of pixels by sampling the pixels while skipping some pixels in either or both of the horizontal direction and the vertical direction. When the number of pixels of the first image is ¼th of that of the second image (see above), the pixel sampling processing section 117 samples the pixels of the second image every other pixels in the horizontal direction, and samples the pixels of the second image every other pixels in the vertical direction. In this case, since the number of pixels of the image subjected to the pixel sampling process is ¼th of that of the image before being subjected to the pixel sampling process, the number of pixels of the first image corresponds to the number of pixels of the second image subjected to the pixel sampling process.

Figure 17:
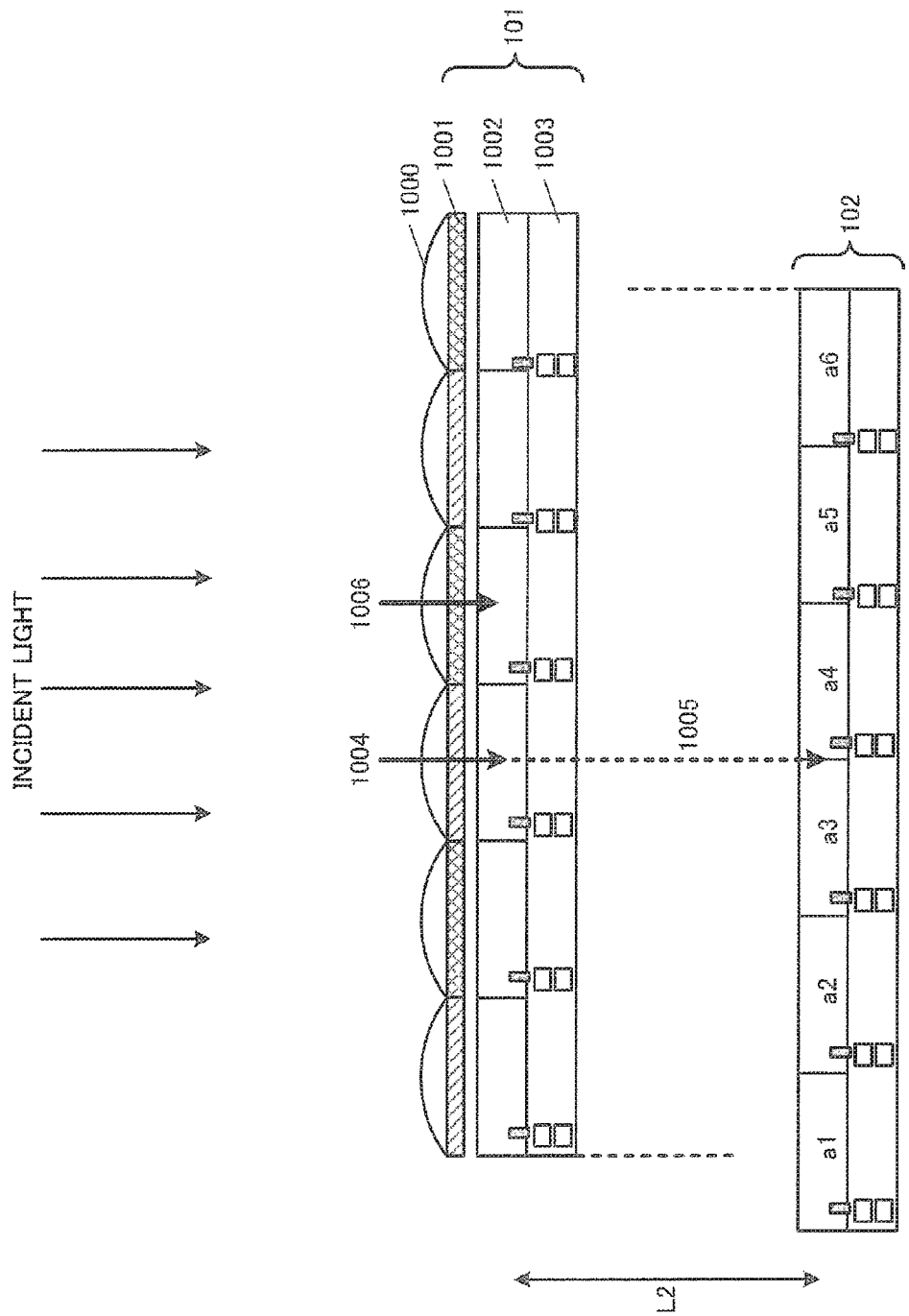
FIG. 17 illustrates a configuration example when a microlens is provided to a first image sensor.

In the second embodiment, a microlens 1000 for focusing light may be provided to the first image sensor 101 (see FIG. 17). A microlens for focusing light is also widely used for a normal imaging device that does not perform the DFD process. When the microlens 1000 is provided to the first image sensor 101, a composite F-number Fc of the F-number of the imaging lens 100 and the Fm of the microlens is used as the value F in the expression (6).

Since the composite F-number Fc is normally smaller than the F-number F of the imaging lens 100, the value on the right side of the expression (6) can be reduced as compared with the case where a microlens is not used, and the distance L2 can be reduced due to the F-number of the microlens. Therefore, the value x in the expression (7) decreases (i.e., the degree of spreading due to diffraction decreases), and the number of taps of the inverse filter used for the diffraction correction process can be reduced as compared with the case where the microlens 1000 is not used.

It is possible to eliminate the effects of the difference in brightness and diffraction from the image information obtained by the second image sensor 102, and by utilizing the method according to the second embodiment. It is also possible to adjust the number of pixels of the second image captured by the second image sensor 102 so as to coincide with that of the sampling image obtained by the first image sensor 101 through the pixel binning process. This makes it possible to implement one-shot DFD with high accuracy using a compact space.

According to the second embodiment, the first image sensor 101 is an image sensor that includes given color filters that are placed in a mosaic-like pattern on a pixel basis (see FIG. 13).

Note that the image sensor that includes given color filters that are placed in a mosaic-like pattern on a pixel basis refers to a Bayer-array image sensor in a narrow sense. Note that the image sensor that includes given color filters that are placed in a mosaic-like pattern on a pixel basis is not limited to a Bayer-array image sensor.

According to this configuration, it is possible to utilize an image sensor widely used for a known imaging device as the first image sensor 101 according to the second embodiment. This makes it possible to easily and inexpensively implement the first image sensor 101, for example.

The imaging device may further include the microlens 1000 that is provided to the first image sensor 101 on a pixel basis, and used to focus light (see FIG. 17).

According to this configuration, the composite F-number Fc can be reduced as compared with the F-number F of the imaging lens 100 (see above), and it is possible to reduce the distance L2, and reduce the number of taps (i.e., the number of multipliers provided to a filter (corresponding to the number of filter coefficients)) of the inverse filter used for the diffraction correction process to reduce the filter processing load, for example.

The imaging device may further include the pixel binning processing section 116 that performs the pixel binning process on at least one of the first image and the second image so that the number of pixels of the first image corresponds to (is identical to in a narrow sense) the number of pixels of the second image (see FIG. 12).

According to this configuration, even when defocus that differs from defocus due to the difference in optical path length has occurred in the second image due to the difference in the number of pixels between the first image and the second image, it is possible to correct the defocus, and appropriately calculate the defocus due to the difference in optical path length (i.e., the difference in focus state).

The imaging device may further include the pixel sampling processing section 117 that performs the pixel sampling process on at least one of the first image and the second image so that the number of pixels of the first image corresponds to (is identical to in a narrow sense) the number of pixels of the second image (see FIG. 20).

According to this configuration, even when defocus that differs from defocus due to the difference in optical path length has occurred in the second image due to the difference in the number of pixels between the first image and the second image, it is possible to correct the defocus, and appropriately calculate the defocus due to the difference in optical path length (i.e., the difference in focus state).

Note that the second image sensor 102 may be an image sensor that has a number of pixels that corresponds to (is identical to in a narrow sense) the number of pixels of the first image sensor 101 that are used to generate the R signal among the RGB signals.

The difference in the number of pixels between the first image and the second image described above occurs when the first image sensor 101 and the second image sensor 102 are identical to each other as to the pixel pitch. Note that it is possible to implement a state in which the number of pixels of the first image generated from the Rch pixels of the first image sensor 101 is identical to the number of pixels of the second image generated by the second image sensor 102 without performing the pixel binning process or the like by increasing the pixel pitch (i.e., reducing the number of pixels per unit area) of the second image sensor 102. When the number of Rch pixels of the first image sensor 101 is ¼th of the total number of pixels (see above), the pixel pitch of the second image sensor 102 may be set to ½ (i.e., the number of pixels per unit area may be set to ¼).

4. Third Embodiment

Figure 21:
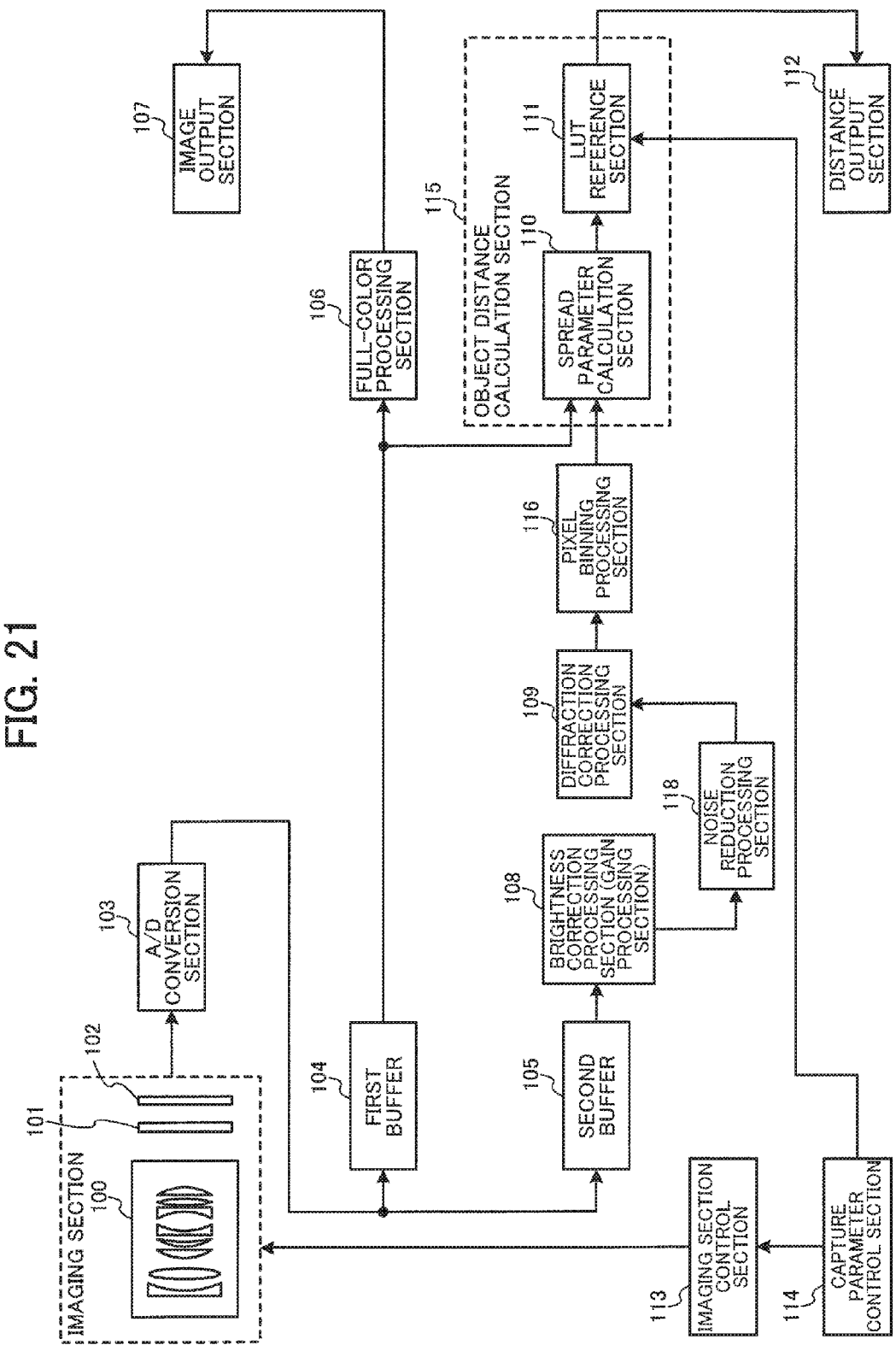
FIG. 21 illustrates another configuration example of an imaging device according to several embodiments of the invention.

The third embodiment is described below. Note that description of the elements of the imaging device according to the third embodiment (see FIG. 21) that are the same as those described above in connection with the first embodiment is omitted, and the differences from the features described above in connection with the first embodiment are mainly described below. As illustrated in FIG. 21, the imaging device according to the third embodiment includes a noise reduction processing section 118 in addition to the configuration described above in connection with the first embodiment.

When the configuration according to the embodiments of the invention is used, the brightness of the second image captured by the second image sensor is lower than that of the first image captured by the first image sensor (see above). Therefore, the brightness correction processing section (gain processing section) 108 performs the brightness correction process that causes the brightness of the second image to be substantially identical to that of the first image (see the first and second embodiments). Specifically, the gain-up process is performed on the second image.

The difference in the amount of defocus due to a factor other than the in-focus state results in a deterioration in DFD determination accuracy (see above). The amount of defocus also changes due to the difference in noise (SN ratio in a narrow sense) in addition to the difference in brightness. Specifically, since noise within the image forms minute contrast, the contrast of the image increases as the amount of noise increases, and the amount of defocus is determined to be smaller than the actual value. The SN ratio of an image normally decreases as the brightness of the image decreases, the first image and the second image differ in SN ratio, and it is likely that the amount of defocus of the second image is determined to be smaller than that of the first image.

Since the relationship regarding the SN ratio does not change due to the correction process performed by the brightness correction processing section 108 that causes the brightness of the second image to be substantially identical to that of the first image, the accuracy of the DFD process decreases.

In the third embodiment, a given noise reduction process is performed on the second image in order to cause the SN ratio of the second image to be substantially identical to that of the first image. Specifically, the imaging device according to the third embodiment includes the noise reduction processing section 118 that performs the noise reduction process on the output from the brightness correction processing section (gain processing section) 108 (see FIG. 21).

The noise reduction processing section 118 performs the noise reduction process at a level sufficient to cancel the difference in SN ratio between the second image subjected to the gain process and the first image. The difference in SN ratio between the second image and the first image is determined by the noise characteristics of the first image sensor and the second image sensor due to the material and the structure, the transmittance of the first image sensor, the quantity (intensity) of incident light, and the like. Therefore, it is desirable to empirically calculate an optimum value, and store the calculated value in the form of a look-up table that uses the pixel value as a key.

Note that the noise reduction process may be implemented using an arbitrary method such as a normal method (e.g., bilateral filter). When using a noise reduction filter or the like, the processing level (noise reduction level) can be set by adjusting various parameters. Therefore, the noise reduction conditions are set so that the processing level is sufficient to cause the SN ratio of the second image to be substantially identical to that of the first image.

Although FIG. 21 illustrates an example in which the noise reduction processing section 118 performs the noise reduction process after the brightness correction processing section 108 has performed the brightness correction process, the configuration is not limited thereto. For example, the noise reduction processing section 118 may perform the noise reduction process on the output from the second buffer, and transmit the resulting image to the brightness correction processing section 108.

The first to third embodiments to which the invention is applied and the modifications thereof have been described above. Note that the invention is not limited to the first to third embodiments and the modifications thereof. Various modifications and variations may be made without departing from the scope of the invention. A plurality of elements described above in connection with the first to third embodiments and the modifications thereof may be appropriately combined to achieve various configurations. For example, an arbitrary element may be omitted from the elements described above in connection with the first to third embodiments and the modifications thereof. Arbitrary elements among the elements described above in connection with different embodiments or modifications thereof may be appropriately combined. Any term cited with a different term having a broader meaning or the same meaning at least once in the specification and the drawings can be replaced by the different term in any place in the specification and the drawings. Specifically, various modifications and applications are possible without materially departing from the novel teachings and advantages of the invention.

What is claimed is:

1. An imaging device comprising:
a first image sensor that is placed to intersect an optical axis of an imaging lens, and captures a first image;
a second image sensor that is placed to intersect the optical axis of the imaging lens so as to be situated at a given distance from the first image sensor, and receives light that has passed through the first image sensor to capture a second image; and
a processor comprising hardware,
wherein the processor is configured to implement:
a brightness correction process that amplifies a pixel value of the second image captured by the second image sensor using a gain that has been set based on a light transmittance of a light-receiving section of the first image sensor, and
an object distance calculation process that performs a depth-from-defocus (DFD) process based on a pixel value of the first image and the pixel value of the second image subjected to the brightness correction process to calculate an object distance, and
the processor is configured to implement the brightness correction process that causes brightness of the second image to be substantially identical to that of the first image.

2. The imaging device as defined in claim 1,
wherein the processor is configured to further implement a noise reduction process that causes an SN ratio of the second image subjected to the brightness correction process to be substantially identical to that of the first image.

3. The imaging device as defined in claim 1, wherein the first image sensor is a direct image sensor that sequentially separates RGB colors in a direction along the optical axis of the imaging lens.

4. The imaging device as defined in claim 1, wherein the first image sensor is an image sensor that includes given color filters that are placed in a mosaic-like pattern on a pixel basis.

5. The imaging device as defined in claim 1, wherein the first image sensor is a back-illuminated image sensor in which a transfer electrode is provided on a side of a semiconductor substrate opposite to an illumination side.

6. The imaging device as defined in claim 1, wherein the processor is configured to further implement a diffraction correction process that performs a process that corrects defocus caused by diffraction due to the first image sensor on the second image captured by the second image sensor.

7. The imaging device as defined in claim 1, wherein the second image sensor is placed at a given distance L that satisfies L>F×r from the first image sensor in a direction along the optical axis of the imaging lens, F being an F-number determined by a lens system that includes the imaging lens, and r is a size of a permissible circle of confusion.

8. The imaging device as defined in claim 1, further comprising:
a microlens that is provided to the first image sensor on a pixel basis, and used to focus light.

9. The imaging device as defined in claim 1, wherein the processor is configured to further implement a pixel binning process, the pixel binning process being performed on at least one of the first image and the second image so that a number of pixels of the first image corresponds to a number of pixels of the second image.

10. The imaging device as defined in claim 1, wherein the processor is configured to further implement a pixel sampling process, the pixel sampling process being performed on at least one of the first image and the second image so that a number of pixels of the first image corresponds to a number of pixels of the second image.

11. The imaging device as defined in claim 1, wherein the second image sensor is an image sensor that has a number of pixels that corresponds to a number of pixels of the first image sensor that are used to generate an R signal among RGB signals.

12. An electronic device comprising the imaging device as defined in claim 1.

* * * * *